Aug. 26, 1969
H. K. WORNER
3,463,472
APPARATUS FOR THE DIRECT SMELTING OF METALLIC ORES
Original Filed Aug. 4, 1966
11 Sheets-Sheet 1
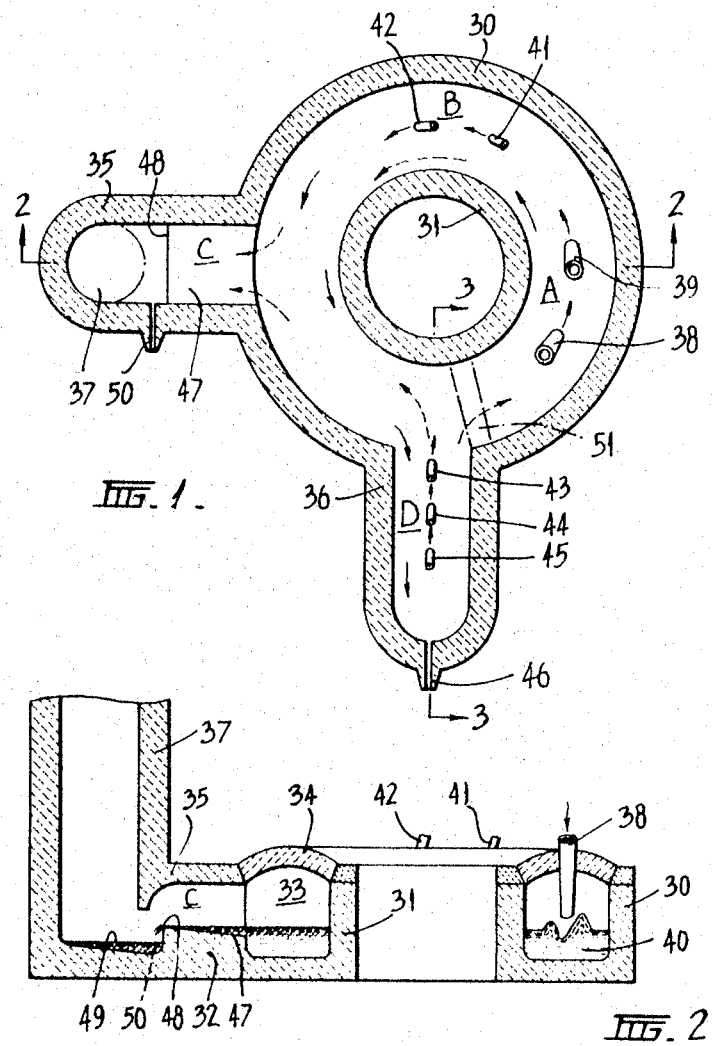
FIG. 1.
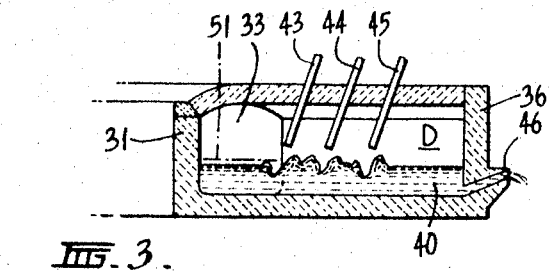
FIG. 2.
FIG. 3.
INVENTOR
HOWARD K. WORNER Aug. 26, 1969  H. K. WORNER  3,463,472
APPARATUS FOR THE DIRECT SMELTING OF METALLIC ORES
Original Filed Aug. 4, 1966  11 Sheets-Sheet 2

INVENTOR
HOWARD K. WORNER

INVENTOR
HOWARD K. WORNER

Aug. 26, 1969      H. K. WORNER      3,463,472
APPARATUS FOR THE DIRECT SMELTING OF METALLIC ORES
Original Filed Aug. 4, 1966      11 Sheets-Sheet 4
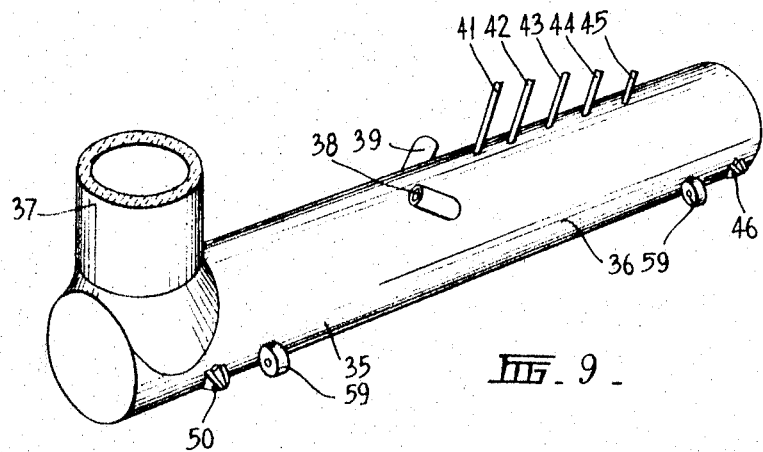
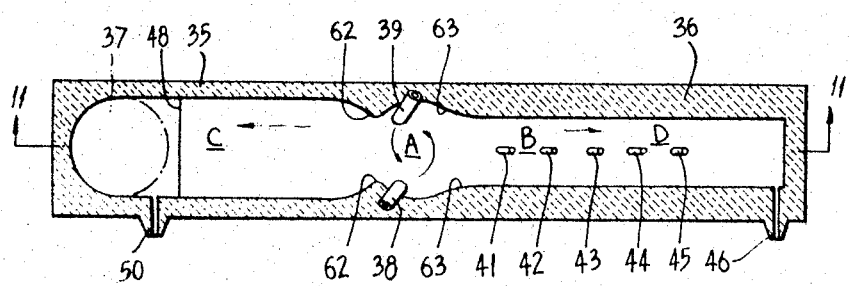
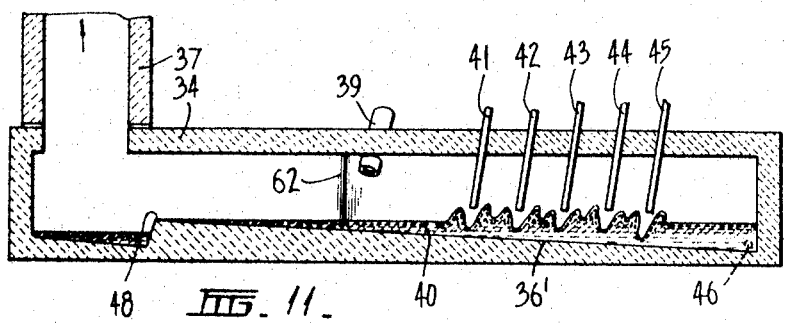
INVENTOR
HOWARD K. WORNER Aug. 26, 1969

H. K. WORNER 3,463,472

APPARATUS FOR THE DIRECT SMELTING OF METALLIC ORES

Original Filed Aug. 4, 1966

INVENTOR
HOWARD K. WORNER

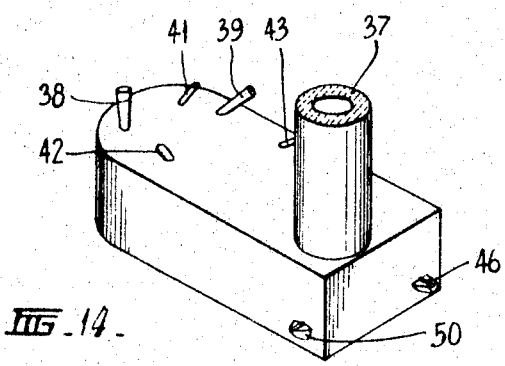
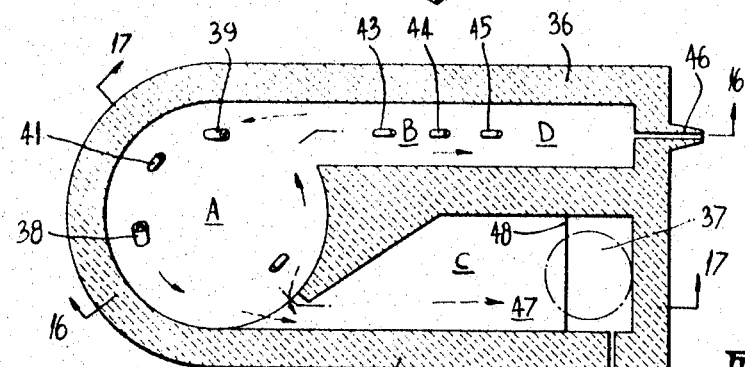
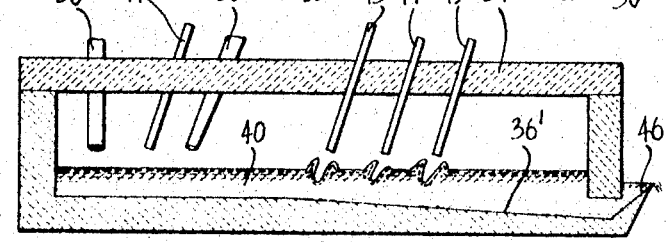
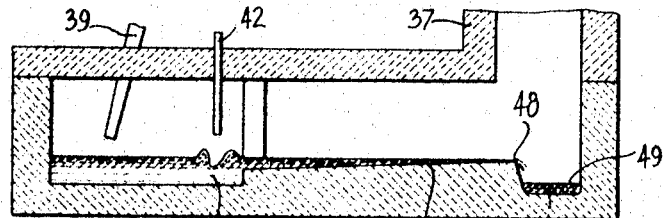

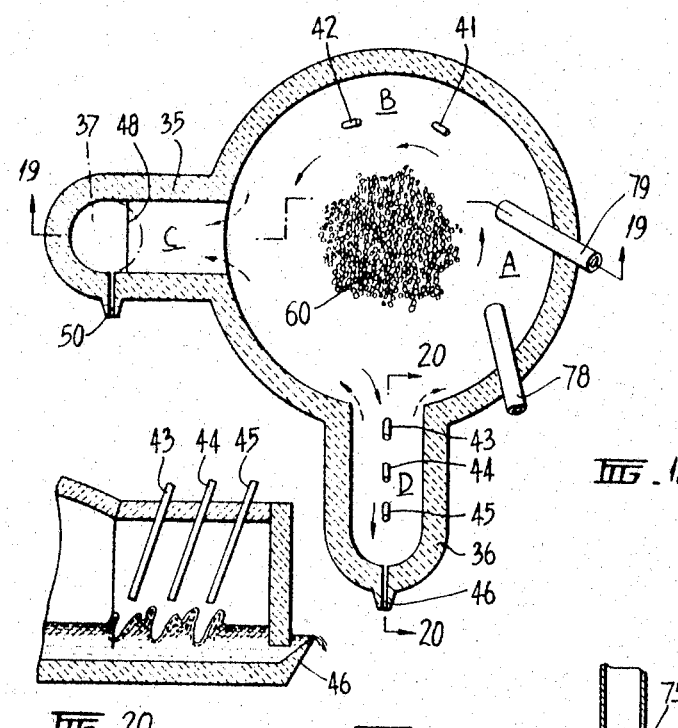
FIG. 18.
FIG. 20.
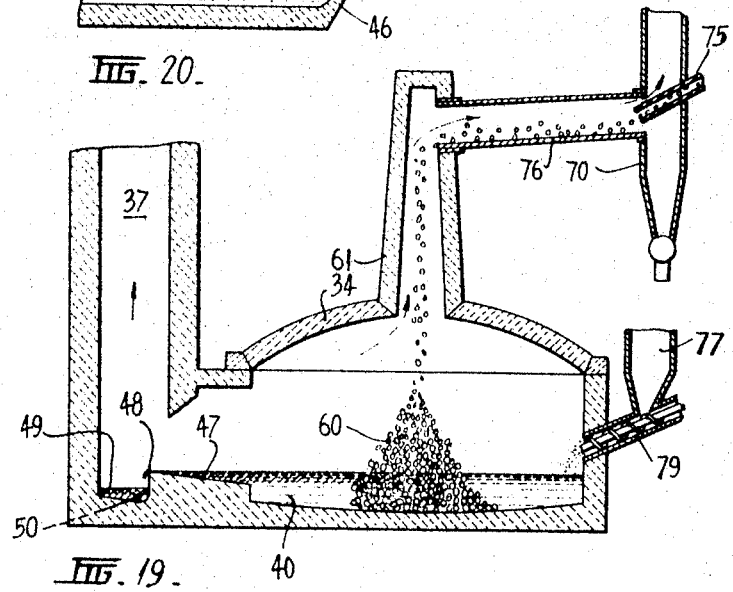
FIG. 19.
INVENTOR
HOWARD K. WORNER

INVENTOR
HOWARD K. WORNER

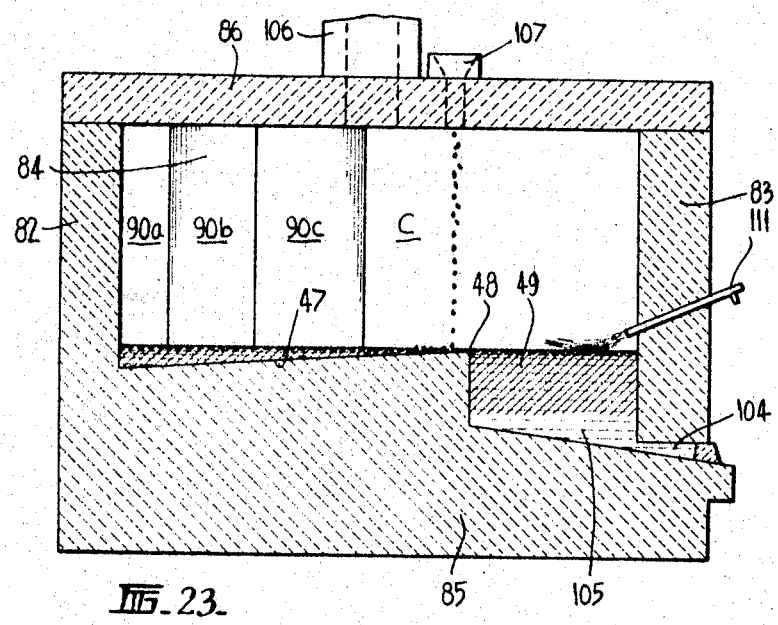
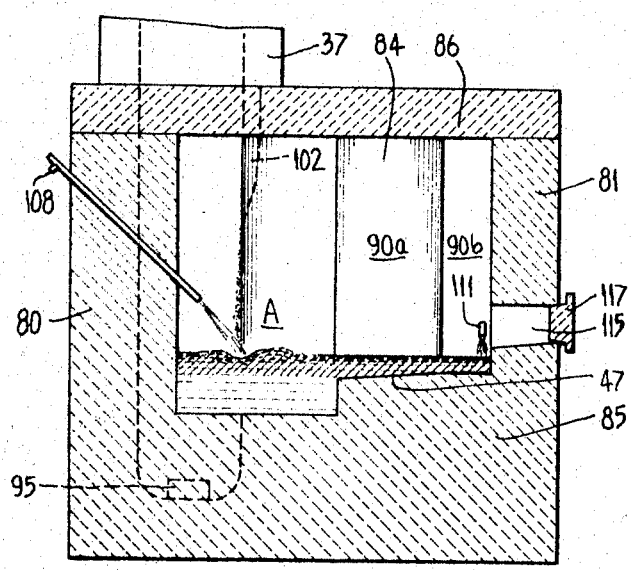

Aug. 26, 1969  H. K. WORNER  3,463,472
APPARATUS FOR THE DIRECT SMELTING OF METALLIC ORES
Original Filed Aug. 4, 1966  11 Sheets-Sheet 10
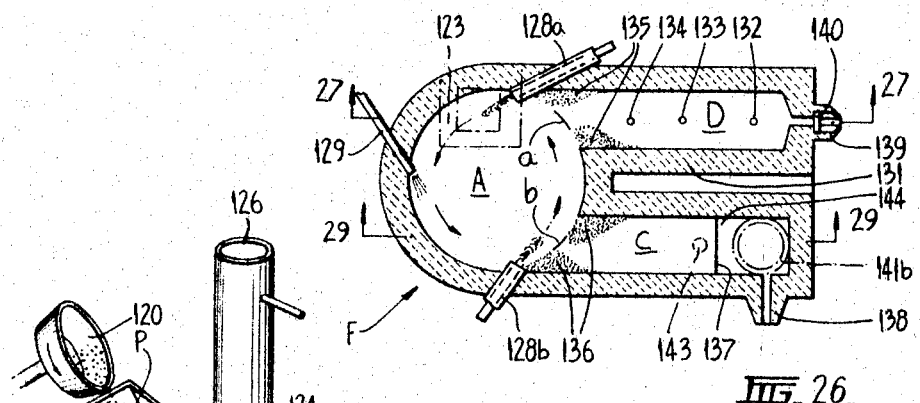
FIG. 26.
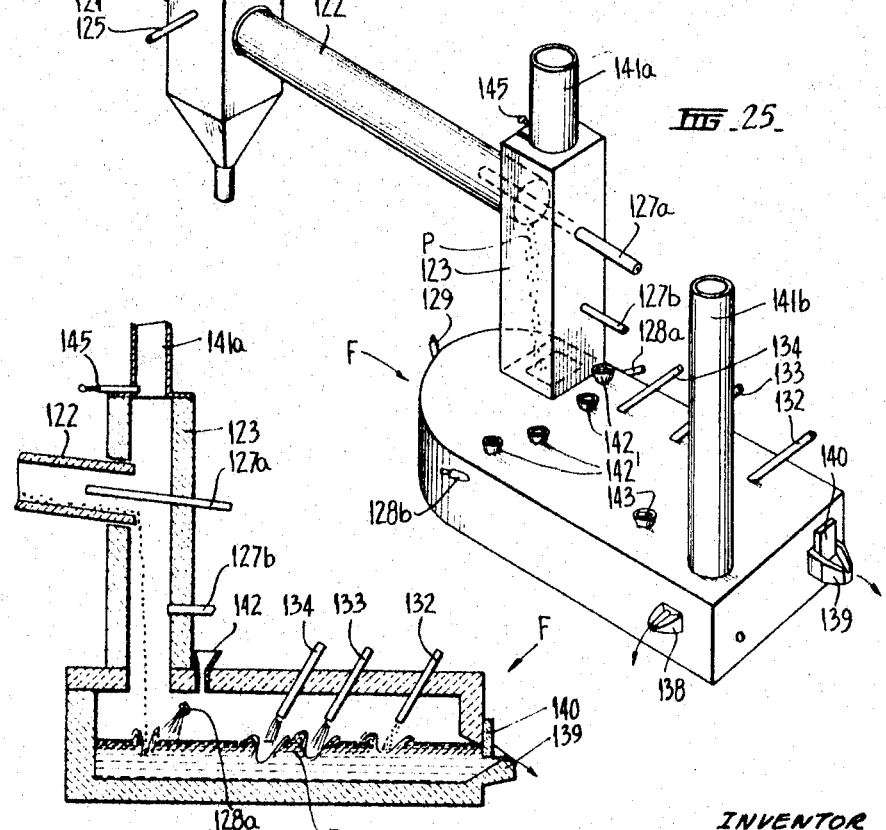
FIG. 25.
FIG. 27.
INVENTOR
HOWARD K. WORNER

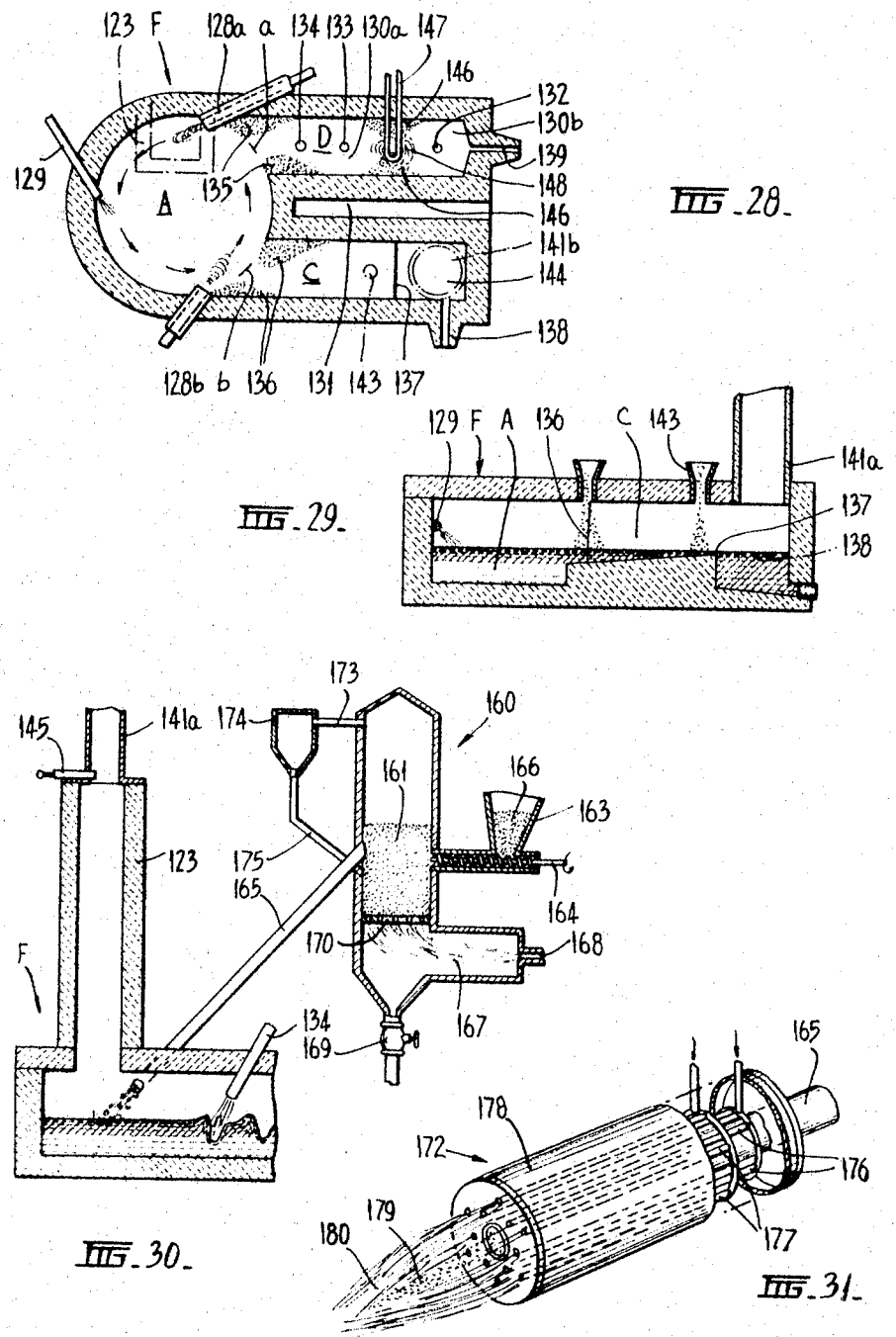

United States Patent Office 3,463,472
Patented Aug. 26, 1969

3,463,472
APPARATUS FOR THE DIRECT SMELTING
OF METALLIC ORES
Howard K. Worner, North Balwyn, Victoria, Australia, assignor to Conzinc Riotinto of Australia Limited, Melbourne, Victoria, Australia
Application Aug. 4, 1966, Ser. No. 570,270, now Patent No. 3,326,671, dated June 20, 1967, which is a continuation-in-part of application Ser. No. 355,661, Mar. 20, 1964. Divided and this application Jan. 5, 1967, Ser. No. 619,108
Int. Cl. C21c 5/32; F27b 3/22
U.S. Cl. 266—11                                    21 Claims

ABSTRACT OF THE DISCLOSURE

Disclosed is apparatus for the continuous production of metals from ore and concentrates including a furnace chamber having intercommunicating smelting, refining and slag separation zones, means for continuously causing a stream of molten material to flow from the smelting zone to the refining zone, means for introducing the ore into the molten material in the smelting zone and oxygen-containing gas injection means for injecting gas into the stream of molten material in the smelting and refining zones to cause turbulence and circulation of the molten material. Outlets are provided in the refining zone for the removal of metal and in the slag separation zone for the removal of slag. The floor of the slag separation zone is sloped upwardly away from the entrance to the slag separation zone to facilitate return of metal to the refining zone.

---

This is a division of U.S. Patent 3,326,671 which, in turn, is a continuation-in-part of U.S. patent application Ser. No. 355,661, filed Mar. 20, 1964 now abandoned.

This invention relates to the direct smelting of metallic ores and concentrates, and refers particularly to a method for the production of metals directly from particulate ores and concentrates and to apparatus for carrying out such method. The term "metal" in this specification includes metals, alloys and other metal-rich products of the smelting operation.

The invention is applicable to the smelting of ores or concentrates (e.g. sulphide ores or concentrates) of metals such as copper, nickel and lead, and to the production of iron and steel from oxide ores or concentrates of iron. It is also applicable to the smelting of zinc bearing ores and concentrates, subject to the considerations referred to subsequently in this specification.

While particularly suited to the direct smelting of finely particulate or powdered ores and concentrates, the invention can, with the appropriate modifications hereinafter described, be used for smelting ores or concentrates a proportion of which is in lump form or all or a proportion of which comprises pelletised or otherwise agglomerated fines. The term "particulate" in this specification refers to and includes solid materials of the above mentioned types, the particles of which are fine enough to be handled in tubes pneumatically or by gravity flow. In most cases the particles are smaller than one centimetre in diameter. As used herein in the specification and claims the term "ores" includes ores, or concentrates of ores, in any form, including pelletized form, and in the case of iron prereduced material in any form.

The invention makes use of the fast reactions between oxygen-containing gas, such as air, oxygen or oxygen-enriched air, and hot particulate oxidisable solid materials such as sulphides or solid carbonaceous fuels. The heat generated by these fast reactions provides the energy necessary to keep the melting and smelting operations going. The invention may therefore be described as autogenous melting and/or smelting. It differs from other autogenous smelting operations, in part, in that it involves reactions under or in proximity to the surface of a flowing stream of molten material, such reactions being induced by injecting or feeding particulate reactants and an oxygen-containing gas onto or under the surface of the aforementioned flowing stream.

The movement of the flowing stream of molten material may be induced by the design of the furnace, by the angles of impingement on the molten material of the particulate raw materials and/or of the injected gases, or by the introduction into the furnace of an "initiator" stream of molten material from an auxiliary furnace or smelter, or by a combination of two or more of these factors. The auxiliary furnace (if employed) may be contiguous with or separate from the furnace of this invention and may be of any suitable type, and the flow of molten material therefrom may be reduced or discontinued when the smelting operation in the furnace of this invention has been stabilized.

A method of producing metals directly from particulate ores and concentrates comprises the steps of: preparing in a furnace chamber a bath of molten material from the particulate ores or concentrates and/or from the products of a previous melting or smelting operation; maintaining in the furnace a feed and primary smelting zone, a refining zone and a slag settling zone; causing the molten material to flow in a stream continuously through the chamber and away from the feed and primary smelting zone; feeding the ores or concentrates in particulate form into or onto the stream of molten material in the feed and primary smelting zone; introducing an oxygen-containing gas into or onto the stream of molten material during its passage through the furnace chamber; developing an exothermic reaction with the bath of molten material between the oxygen-containing gas and at least one component of the molten material; withdrawing slag from the slag settling zone; withdrawing molten material from the refining zone; and withdrawing gaseous products of reaction from the furnace chamber. As used herein in the specification and claims the term "into," in reference to introduction and contact of a gas or ore with molten material, includes, without limitation, introduction of the gas or ore from either above, at or below the surface of the molten material.

A method of producing metals directly from particulate ores or concentrates comprises the steps of: preparing in a furnace chamber a bath of molten material from the particulate ores or concentrates and/or from the products of a previous melting or smelting operation; maintaining in the furnace chamber a feed and primary smelting zone; a secondary smelting zone, a slag settling zone, and a refining zone; causing the molten material to flow in a stream continuously through the chamber from the feed and primary smelting zone to the secondary smelting zone and to the refining zone; causing slag formed on the surface of the molten material to flow to the slag settling zone; feeding the particulate ores or concentrates into or onto the stream of molten material in the feed and primary smelting zone; introducing an oxygen-containing gas into or onto the stream of molten material at two or more points therealong; developing an exothermic reaction within the bath of molten material between the oxygen-containing gas and at least one component of the molten material; tapping slag from the slag settling zone, tapping metal from the refining zone; and withdrawing gaseous products of reaction from the furnace chamber.

The invention in one general form is apparatus for carrying out the abovementioned method, comprising: a furnace having a substantially enclosed chamber in which is maintained a continuously flowing stream of molten material, means for feeding particulate ores or concentrates into or onto the stream of molten material, means for introducing oxygen-containing gas into or onto the stream of molten material, means for withdrawing slag from the furnace at one point, means for withdrawing molten metal from the furnace at another point, and means for discharging gaseous products from the furnace.

The term "lance" in this specification includes a tube having one or more discharge outlets through which particulate material and/or oxygen-containing gas, such as air, oxygen or oxygen-enriched air, and/or gaseous, liquid or particulate solid fuel and/or fluxes or other additives, is or are injected or fed into the furnace.

The refractories used to line the furnace are appropriate to the reactants used and products formed in the furnace and to the temperature and other conditions existing in the furnace. Alternatively in certain zones of the furnace fluid-cooled jackets may be used to form the walls and/or roof of the furnace.

The furnace of this invention when viewed in plan may be linear, annular, rectangular, D-shaped, U-shaped or of other suitable shape, including the forms of the invention illustrated in the accompanying drawings.

In this specification the term "annular furnace" refers to a furnace whether circular or otherwise in which one or more continuous circuits is provided for the flow of molten material, and in which portion of the molten material is caused to re-cycle from the refining zone into the feed and primary smelting zone. The invention includes, but is not limited to, the use of an annular furnace.

The slag settling zone and the refining zone of the furnace may comprise branches or extensions to the furnace which connect with the smelting zone or zones, and in one form of the invention the slag settling zone is disposed to connect with the stream of molten material before the latter reaches the refining zone. The gas offtake is conveniently located above the slag settling zone or branch.

The particulate raw materials (which are preferably preheated) are jetted or fed into or onto the molten material in the furnace at the feed and primary smelting zone. These materials may be fed by screw feeders, pneumatic injection or other means. Oxygen-containing gas is preferably introduced with the particulate materials, and may also be introduced into the furnace at other positions so as to impinge onto or into the flowing stream of molten material.

It has also been found desirable to ensure vigorous motion, stirring or turbulence of the molten material at the point of introduction of the particulate materials, i.e. in the feed and primary smelting zone, and the injection or feeding of the particulate materials and/or oxygen containing gas is preferably effected so as to achieve this condition.

The heat developed within the bath of molten material by exothermic reactions may be supplemented by the burning of particulate materials in transit to the bath and/or by burning of combustible gases generated by reactions within the bath and/or by combustion of carbonaceous fuel added with the particulate raw materials.

The invention makes use of modern techniques for dispensing and injecting powders along with air or air enriched with oxygen or other gas. In some cases a proportion of the particulate materials and any lump materials may be fed into the bath under gravity or introduced by screw feeders.

The invention takes advantage of the speed of reaction between hot fine particulate sulphides on the one hand or finely particulate coal or the like on the other, and hot oxygen-containing gases. As soon as the particulate materials enter the hot furnace and certainly when they strike or enter the molten bath they react vigorously. In the case of sulphides, exothermic reactions of the type $$MS + O_2 \rightarrow M + SO_2$$

occur, and in the case of coal, blown or fed in with fine ore, the carbon in the coal burns to CO and a little to $CO_2$ but such $CO_2$ tends, in the feed and primary smelting zone, immediately to react with further hot particles of coke or char producing CO according to the reaction $$C + CO_2 \rightarrow 2CO$$

The carbon monoxide is then available both to reduce metal oxides and to be burnt and thus give off more heat as the gases pass on through the furnace.

It might be thought that because particulate materials are being injected into the furnace, serious dust losses would result. This, in fact, is not the case because the rapidly heating, and in some cases partially molten, particles are readily absorbed into the bath (which is usually in a frothing or bubbling condition) into which they are fed or injected. In effect, a sort of scrubbing action is achieved.

Means such as a gas barrier may be provided in the furnace above the stream of molten material to substantially prevent reverse flow of gases.

The slag settling zone or branch is preferably constructed with a ridge or slage overflow region and with the floor of said zone or branch sloping upwardly from the furnace chamber to the ridge or slag overflow region. The end of the floor of the slag zone or branch adjacent to the smelting chamber of the furnace is preferably located at or near the intended level of the matte or metal in the said chamber, and the level of the ridge or slag overflow is preferably located above the intended level of the matte or metal.

The conditions in the slag settling zone, and in the lower region of the exit end of the refining zone from which the metal is tapped, are preferably quiescent. Gases may be caused to impinge into or onto the surface of the material in the refining zone, or a portion thereof, in such a manner as to create a countercurrent flow of slag in the refining zone, on the surface of the molten metal or matte, away from the metal outlet.

By the invention, a significant composition gradient is developed between the feed zone and the point at which the metal is tapped.

Some forms of the invention are illustrated in the accompanying drawings, wherein:

FIGURE 1 is a view in sectional plan of one form of furnace;

FIGURE 2 is a view in sectional elevation on the line 2—2 of FIGURE 1;

FIGURE 3 is a view in section on the line 3—3 of FIGURE 1;

FIGURE 9 is a perspective view of a further form of furnace;

FIGURE 10 is a view in sectional plan of the furnace shown in FIGURE 9;

FIGURE 11 is a view in sectional elevation on the line 11—11 of FIGURE 10;

FIGURE 14 is a perspective view of a further form of furnace;

FIGURE 15 is a view in sectional plan of the furnace shown in FIGURE 14;

FIGURE 16 is a view in sectional elevation on the line 16—16 of FIGURE 15;

FIGURE 17 is a view in sectional elevation on the line 17—17 of FIGURE 15;

FIGURE 18 is a view in sectional plan of a further form of furnace;

FIGURE 19 is a view in sectional elevation on the line 19—19 of FIGURE 18; and

FIGURE 20 is a view in sectional elevation on the line 20—20 of FIGURE 18;

FIGURE 23 is a view in sectional elevation on the line 23—23 of FIGURE 21;

FIGURE 24 is a view in sectional elevation on the line 24—24 of FIGURE 21;

FIGURE 25 is an isometric view of apparatus for the treatment of ores or concentrates, particularly of iron oxide ores or concentrates, according to the invention;

FIGURE 26 is a sectional plan view of the furnace shown in FIGURE 25;

FIGURE 27 is a view in sectional elevation of the furnace shown in FIGURE 25;

FIGURE 28 is a sectional plan view of a modified form of furnace;

FIGURE 29 is a view in sectional elevation taken on the line 29—29 of FIGURE 26;

FIGURE 30 is a view in sectional elevation of a modified ore feed arrangement, and FIGURE 31 is a perspective view of a device for feeding and pre-heating particulate ores or concentrates.

Figure 4:
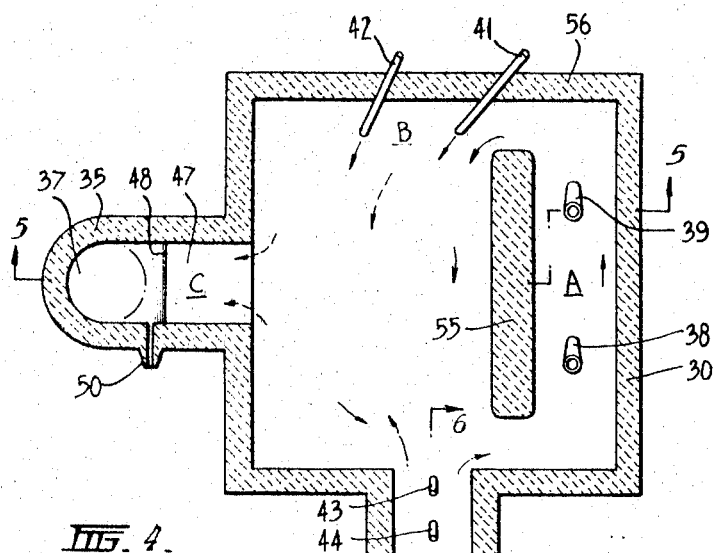
FIGURE 4 is a view in sectional plan of another form of furnace.

Referring to the drawings, where the same reference characters are used to indicate like or corresponding parts, and with particular reference to FIGURES 1 to 3, the furnace shown in these figures is of the "annular" type and comprises an external circular wall 30, an internal circular wall 31, a floor 32, and annular chamber 33, and a domed annular roof 34. A slag settling branch 35 and a refining branch 36 are connected to the annular chamber 33. A gas offtake 37 is provided above the slag settling branch 35.

Particulate ores or concentrates, preferably preheated, and where necessary preblended with carbonaceous fuel, are fed pneumatically or by other means into the annular chamber through lances or powder feeders 38, 39 which project through the roof 34 or through the external wall 30.

A bath of molten material 40 is formed in the bottom or trough of the chamber 33 and is caused to flow generally in an anti-clockwise direction as shown in FIGURE 1. In this figure the direction of flow of metal or matte is shown by arrows in full lines and the direction of flow of slag is shown by arrows in dotted lines. The particulate ores or concentrates are fed into or onto the molten material 40 in the feed and primary smelting zone A.

Oxygen-containing gas is injected into or onto the molten material 40 through lances 41, 42 which project into the secondary smelting zone B, and also through lances 43, 44, 45 which project into the refining branch 36, and if desired oxygen-containing gas may also be injected with the particulate material through lances 38, 39.

The lances 38, 39, 41, 42, 43, 44 and 45 are shown in the drawings to terminate a short distance above the surface of the molten material 40 so that the particulate materials and/or gases injected therethrough are directed onto the surface of the molten material, but in an alternative form of the invention (not shown) any of the lances may be designed and arranged to project beneath the surface of the molten material.

All or some of the lances 38, 39, 41 and 42 may be tilted or inclined at an angle to the vertical in order to impart or to assist in imparting forward movement to the molten material 40 in the required direction in the chamber 33 (anti-clockwise in the drawing). The lances 43, 44, 45 are inclined in the reverse direction to that of the flow of metal or matte in the refining branch 36, so as to create a countercurrent flow of slag in the refining branch 36 away from the taphole 46 and towards the annular chamber 33. The metal or matte flows outwardly in the refining branch 36 and is discharged through taphole or outlet 46.

The slag branch 35 is provided with an outwardly and upwardly sloping floor 47, a ridge or slag overflow 48, a slag pool or reservoir 49 and a slag settling zone C.

A gas barrier 51 may be provided in the annular chamber 33 to extend from the roof 34 almost to the surface of the molten material 40.

In the case of sulphide concentrate smelting, the process achieves the continuation of the oxidation of sulphur, iron and some other readily oxidisable elements commenced in the feed zone A. The sulphur leaves the bath as $SO_2$ while the iron and other oxidisable elements enter the slag by a reaction of the type $$MO + SiO_2 \rightarrow MSiO_3$$

In the case of iron ore smelting, the oxygen-containing gas blown in at positions such as 41 and 42 serves to combust any unburnt carbon or carbon monoxide leaving the feed zone A and entering the secondary smelting zone B. The oxygen-containing gas blown in at positions such as 43, 44, 45 serves to oxidise out the carbon from the semi-steel bath to bring it to the desired value before steel is tapped through taphole 46.

Slag formed in the feed and primary smelting zone A and secondary smelting zone B flows slowly and quiescently out through the slag branch 35, over the ridge or overflow 48 and is discharged through taphole 50. The slag in the slag branch 35 is kept liquid by heat exchange (from the hot gases moving to the gas offtake 37).

The metal or matte continues to flow around the annulus and a proportion enters the refining branch 36, where it is withdrawn continuously or semi-continuously through taphole 46. Any slag which forms in the refining branch 36 is caused to flow countercurrently back into the annular chamber 33 and portion of it may be recycled and portion may flow countercurrent to the matte or metal and leaves the furnace at 50.

Gases generated by lancing at positions such as 38, 39, 41, 42 tend to move countercurrently with the molten materials, whereas gases generated by lancing at positions such as 43, 44, 45 may tend to move countercurrent to the molten material, at least in portion of the annulus.

The proportion of the molten material which is recycled into the feed and primary smelting zone A is not critical and is determined mainly by the relative rate of feed of solids to the rate of tapping of slag through taphole 50 and of metal through taphole 46.

In starting up the furnace only fuel and air or oxygen enriched air are injected into the annular chamber 33 via burners at positions such as 38, 42 and 45. The starting pool of molten material may be built up from either concentrates plus flux, and/or from the products of a previous run.

In addition to the fluxing materials which may be added with the particulate ore or concentrates, more finely particulate flux can appropriately be added through one or more of the lances in the refining branch 36 such as, for example, through lance 45. Alternatively it may be added in a position near to lance 45 through ports or side doors (not shown). The slag generated by the reaction of this flux addition tends to move countercurrent to the matte or metal. In the smelting of sulphides this assists in the removal of the last traces of unwanted elements, for example, iron in the case of copper and nickel, and in the case of steelmaking, the countercurrent slag flow assists refining with respect to sulphur and phosphorus and some other impurities.

The taphole 46, from which metal or alloy may be removed continuously or semi-continuously, may be of any appropriate form; for example, it may be a submerged taphole or a syphon or an open lip but in the last case a slag baffle (not shown) either internal or external to the end wall of the refining branch 36 is required to prevent slag flowing out with the metallic product.

The floor of the refining branch 36 may be more or less horizontal in the case of iron and steelmaking. In the case of smelting of sulphides, however, it is often an advantage for the said floor to slope gently downwards from the main furnace floor towards the taphole 46 as shown at 36' in FIGURES 11, 13 and 16. In the case of both copper and lead production, it is advantageous to have at the end of the refining branch 36, a "sump" 46' (such as that shown in FIGURE 13) which is preferably substantially deeper than the rest of the bath of the refining branch 36. The submerged taphole 46 or syphon can appropriately be connected to the bottom of this sump 46'.

It is advantageous if the metal in the bottom of the sump 46' is cooled to within about 80° C. to 150° C. of its melting point before it passes out through the submerged taphole or syphon. This is to cause as much as possible of the contained sulphur to come out of solution in the metal before the metal leaves the furnace. The cooling may be achieved by use of a deep sump or by cooling fluid passing through metal coolers or by blowing cold air through a lance or lances deeply submerged in the sump or by other suitable means.

When it is desired to incorporate lump materials, as for example cement copper in the case of copper smelting, these materials can be added through ports or doors (not shown) in the walls or roof of either the annulus portion of the furnace or of the refining branch 36.

It will be appreciated that widely differing chemical reactions and conditions are involved in each of the several applications of the invention to different ores or concentrates. Thus, in the smelting of sulphides oxidising conditions exist right around the annulus, while in the smelting of iron oxides the atmosphere, at least in the feed zone A, is a reducing one.

In the latter case, it is an advantage to have the bath covered with solid carbonaceous material in the feed zone and for some distance along the path of liquid flow thereafter. The necessary carbon in the form of pulverulent coal or char is added along with the fine ore or it may be jetted into the bath through auxiliary lances in the vicinity of the feed zone A in the case of iron and steel production. The carbon content of the bath metal in the annulus portion of the furnace is maintained in the semi-steel range so that there is adequate "internal" fuel in the metal for heat generation during the final lancing with oxygen-containing gas in the refining branch 36.

The sensible heat in the exit gases, in each form of the invention, may be used for a number of purposes, such as drying and preheating the particulate feed materials, preheating the oxygen-containing gases, for steam raising or for other purposes. In the case of iron smelting, some of the gas, utilized with fine coal or char, may also be used for partial pre-reducing of the particulate ores before feeding to the furnace.

In order to drain the furnace at the end of a campaign or run a drain plug can be provided at a convenient position; alternatively the whole furnace may be designed to permit slight tilting towards the taphole 46.

Figure 5:
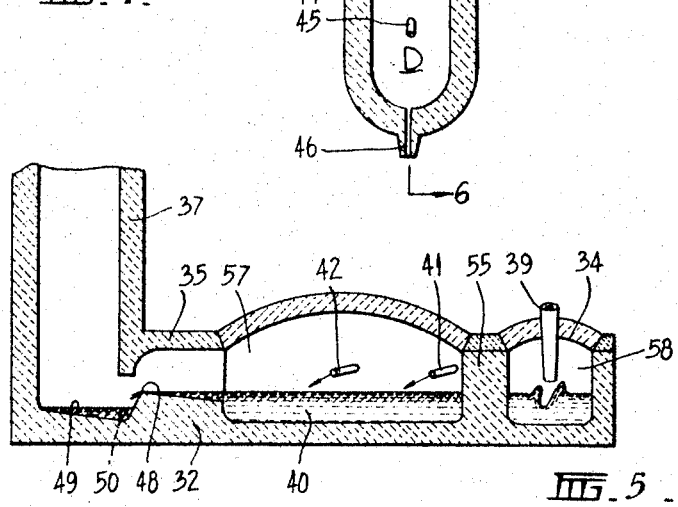
FIGURE 5 is a view in sectional elevation on the line 5—5 of FIGURE 4.
Figure 6:
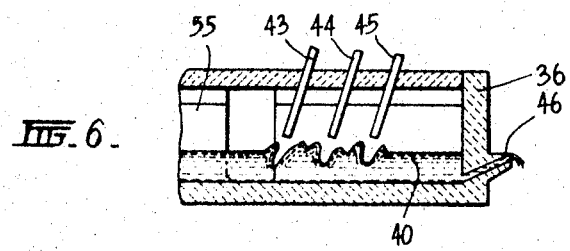
FIGURE 6 is a view in section on the line 6—6 of FIGURE 4.

In FIGURES 4, 5 and 6 a furnace of rectangular shape is shown. The references have the same connotations as in FIGURES 1, 2 and 3.

The furnace has an outer wall 30 and an internal island wall 55. The lances 41 and 42 enter the furnace through the side wall 56 and are disposed at an angle as shown in FIGURE 4 in order to impart forward movement to the molten material which flows from the feed and primary smelting zone A towards the secondary smelting zone B and then continues its anti-clockwise movement within the furnace.

It will be noted that the gas space 57 above the molten material to the left of the island wall 55, as viewed in FIGURES 4 and 5, is considerably greater than the gas space 58 on the feed zone side of the wall 55. This has the advantage that the gas flow rate is lowered in the larger space 57 thus enabling entrained particulate materials and slag droplets to fall back into the bath before the gases pass out through the slag branch 35 and gas offtake 37.

In the case of the smelting of iron ore, the slowing down of the gases in this space 57 also facilitates the burning of the carbon monoxide leaving the feed zone A. It is advantageous in this particular application to blow the oxygen-containing gas through turbulent jets at positions such as 41 and 42. This assists the complete combustion of carbon monoxide and of fine entrained char or coke particles.

Figure 7:
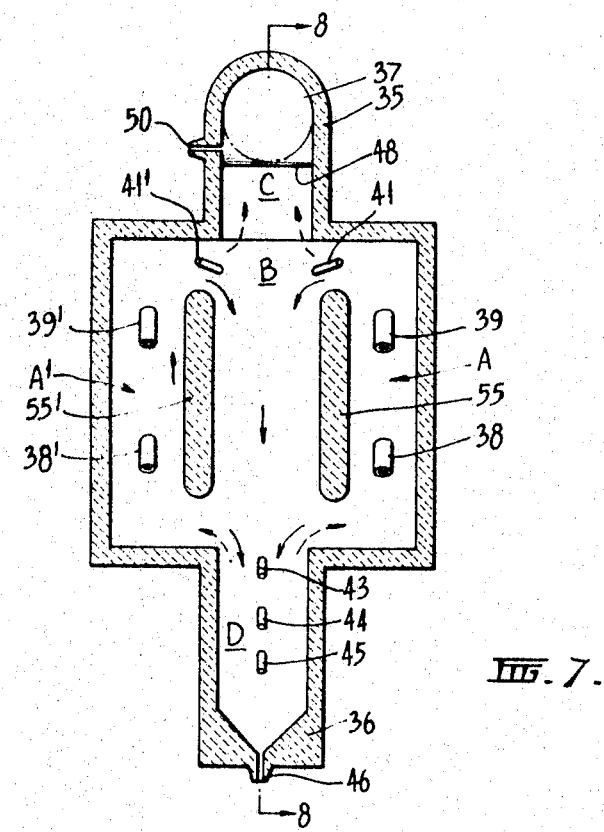
FIGURE 7 is a view in sectional plan of a further form of furnace.
Figure 8:
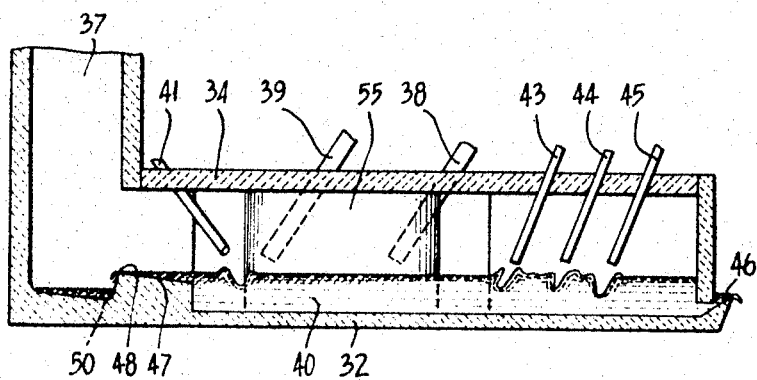
FIGURE 8 is a view in sectional elevation on the line 8—8 of FIGURE 7.

In FIGURES 7 and 8 a furnace is shown having two island walls 55 and 55', two feed and primary smelting zones A and A', and two sets of lances 38, 39 and 38' and 39', through which particulate materials may be introduced either concurrently or alternately into the feed zones A and A' respectively. Lances 41 and 41' inclined in opposite directions, are provided for injection of oxygen-containing gas. In this furnace the slag branch 35 is disposed opposite to the refining branch 36.

In the case of this furnace it is possible to shut down and effect repairs to one of the feed zones A or A' while the other is still operating. If, for the purpose of fettling or for other reasons it is desired to shut down and isolate one of the feed zones, a refractory barrier (not shown) is lowered through removable portions of the roof 34 of the furnace at positions at the ends of the island wall 55 and 55' as the case may be.

In FIGURES 9, 10 and 11 a linear furnace is shown having a central feed and primary smelting zone A into which particulate raw materials and (if desired) oxygen-containing gas, are injected through inclined lances 38, 39. These lances are arranged approximately tangentially to the feed zone A, so as to impart a circulatory or rotary movement to the molten material in said zone. The chamber is narrowed on either side of said zone A as shown at 62 and 63 in FIGURE 10, thereby providing an approximately circular feed zone in which the said circulatory movement of the molten materials is facilitated.

The slag branch 35 and the refining branch 36 are disposed on opposite sides of and are connected to the central feed zone A as shown in FIGURE 10. The furnace may be tilted through a slight angle on rollers 59 to facilitate fettling of refractories and/or draining of liquids at the end of a campaign. A stationary chimney is provided over the gas offtake aperture 37 at the end of the furnace.

Figure 12:
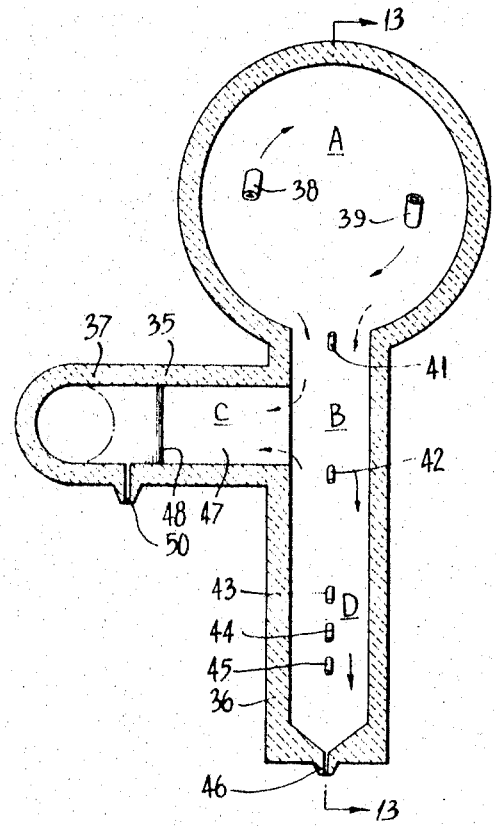
FIGURE 12 is a view in sectional plan of a further form of furnace.
Figure 13:
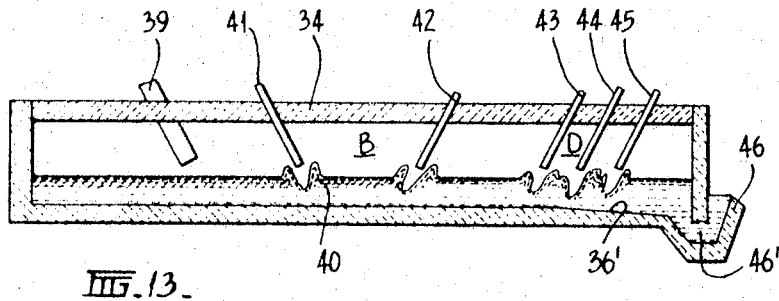
FIGURE 13 is a view in sectional elevation on the line 13—13 of FIGURE 12.

In FIGURES 12 and 13 a further modified form of furnace is shown having a circular feed smelter zone A into which particulate materials and (if desired) oxygen-containing gas are injected through lances 38, 39 which are angled so as to impart circulatory movement to the molten material in zone A. The slag branch 35 extends laterally at right angles to the refining branch 36.

In a modified form of the invention (not shown) the branch leading to the secondary smelting zone B, slag settling zone C and refining zone D, which are arranged in a straight line in said branch, extends tangentially from and connects with the feed and primary smelter zone A.

Circulation is imparted to the molten material in the feed zone A, preferably in a direction which directs such material along the tangential branch to the secondary smelting zone B and hence to zones C and D. The branch may be narrowed between zones C and D. In one alternative arrangement (not shown) two circulatory feed zones may be provided in which circulation of molten material is effected in opposite directions, and the said branch leading to zones B, C and D is connected centrally to the chamber containing the two circulatory feed zones.

In the form of the invention shown in FIGURES 14 to 17, a U-shaped furnace is shown in which the slag branch 35 and refining branch 36 are parallel and side-by-side. Particulate feed materials are injected through either or both lances 38, 39. Oxygen-containing gas is injected through lances 41, 42 and lances 43, 44, 45. Particulate materials and/or oxygen-containing gas may be fed together or separately through lances 38, 39 as desired. By appropriate choice of angles of the lances 38, 39, 41, 42 and of the gas pressures used, it is possible to achieve a relatively long residence time of the reacting particulate materials in the gas space above the circulatory feed zone A before such materials impinge on the molten material in said zone. A conical or domed roof (not shown) may be provided over the circulatory feed zone A and the said roof may be of good quality refractory or may be fluid cooled metal. A gas offtake chimney 37 is provided at the end of the slag branch 35.

In the FIGURES 18 to 20, an annular furnace is shown which is provided with a central core 60 of lump ore or concentrates or agglomerated or pelletised fines. The pelletised ore or the like is fed through chute 75 into a rotary kiln 76, heat exchange being effected to the incoming pelletised ore from the exit gases passing up stack 70. The residence time in the kiln 76 is sufficient to enable some pre-oxidation or pre-reduction (as the case may be) of the pelletised ore or concentrate to be effected before the material is discharged into the vertical shaft 61 and thence into the centre of the furnace. Further particulate ore or concentrate may be charged to the feed-smelter zone A of the furnace by means of hoppers 77 and screw feeders 78, 79. Oxygen-containing gas is introduced through lances 41, 42, 43, 44 and 45. Other features of the furnace are similar to those of the furnace shown in FIGURES 1 to 3.

It is undesirable to have too high a velocity of the hot gases passing out through kiln 76 otherwise dust losses may be considerable. This, however, is usually only a problem if much fine unagglomerated material is fed in via chute 75.

In some applications, and particularly with iron and steel manufacture, it is advantageous to add a little fine char or lump coal or charcoal to the feed to the kiln 76. These carbonaceous lumps help not only to ensure maintenance of strongly reducing conditions in the kiln but to prevent welding of the iron in the pellets or other lumps to each other or to the inside walls of the kiln.

It has been found to be a desirable practice to blend in with fine iron ore or concentrates before pelletising, a proportion of finely ground coke breeze, or char or non-coking coal. The proportion is normally between 10 and 20%. Such carbonaceous material in the pellets facilitates fast reduction reactions in the kiln 76; it also helps to prevent the aforementioned welding of pellets to each other and to the kiln walls. Some of this carbon usually remains in the hot pellets as they are discharged into the smelting zone of the furnace proper where it is dissolved in the bath of hot metal. It then becomes part of the "internal fuel" in the bath as it moves into the refining zone D under the air and/or oxygen jets.

The pellets may be formed with or without binding agents and with or without fluxes incorporated.

If it should be found that the carbon monoxide-rich gases passing up shaft 61 to the kiln are too hot, they may appropriately be cooled by injecting steam in through a lance or port (not shown). Such steam, apart from its cooling effect, enters into a "gas shift" reaction with the very hot carbon monoxide thus:

$$H_2O + CO \rightarrow H_2 + CO_2$$

The hot hydrogen thus produced acts as a highly efficient reductant in the kiln 76. The furnace shown in FIGURES 21 to 24 is particularly useful for the direct smelting of copper sulphide concentrates by the process of the invention and this embodiment of the invention is hereinafter described with reference to the smelting of such concentrates although it may also be used for the smelting of other ores and concentrates, particularly sulphide concentrates of non-ferrous metals such as nickel and lead.

The furnace is provided with refractory side walls 80, 81, end walls 82, 83, an internal wall 84 extending between the side walls 80, 81, a floor 85 and a roof 86. An air cooling channel 87 is provided in the internal wall 84. The lining refractory is dense high grade chrome magnesite.

A substantially circular smelting zone A is formed in the furnace adjacent to one end of the internal wall 84 and connects at 88 with a refiner branch or zone D and at 89 with a slag separation branch or zone C. The portions 90a, 90b of the slag separation zone C connecting with the smelting zone A are constricted in width relative to the remaining portion 90c of said zone C.

Warm dry copper sulphide concentrates are introduced in particulate form into the feed and smelting zone A through lance 38 which in this embodiment is arranged concentrically within an outer tube 91, air and sometimes air plus a little oil being blown under pressure through the annular space between the lance 38 and tube 91. Silicious flux may be added with the concentrates. The feed material is preferably preheated (e.g. to a temperature of between 200° C. and 350° C.) prior to or during its introduction into the furnace.

The concentrates are injected into the bath of molten material 40 in the smelting zone A in such a manner as to cause turbulence and agitation of the molten material. The lance 38 is arranged at an angle of between about 40° to about 80° to the horizontal as shown in FIGURE 22 so as to cause the concentrates to impinge at an angle onto the surface of the molten material 40 in zone A. The lance 38 is disposed approximately tangentially to the circular smelting zone A so as to cause circulation of the molten material in the said zone in the direction shown by the arrows 92 in FIGURE 21. The direction of circulation of the molten material 40 in zone A is such that slag flowing from the refiner zone D to the slag separation zone C travels by the longest route through zone A so that it has a maximum residence time in zone A. The floor 93 of zone A of the furnace is substantially horizontal.

The refiner branch D of the furnace is of elongated rectangular shape in plan and its floor 94 slopes downwardly from the junction of zone D with zone A to a V-shaped passage or sump 95 formed in the end wall 83 through which molten copper 97 flows from the refiner zone D. The angle of slope of the floor 94 is between 3° and 30°, preferably between 5° and 10°. The lower end 96 of the end wall 83 projects downwardly below the level of copper 97 in the refiner zone D. The sump 95 communicates with a metal reservoir 98 formed in furnace extension 99. A copper taphole 46 communicates with the metal reservoir 98 below the slag level in the refiner zone D and preferably at approximately the same level as that of the matte-white metal complex 100 in the refiner branch D.

Lances 43, 44, 45 project, at an angle to the horizontal, through the side wall 80 of the furnace and air under pressure is injected through the lances 43, 44, 45 into the molten material in the refiner zone D, the angle of impingement of the lances and the air pressure being such that the injected air bubbles out into the molten matte and creates vigorous turbulence of the molten material in the said zone D.

Silica or silicious ore flux is added mechanically or pneumatically through ports 102 in the internal wall 84. The ports 102 are disposed more or less directly opposite to the lances 43, 44, 45 so that the silicious material delivered from the ports 102 serves to protect the refractory of the wall 84 from erosion due to splashing of molten material caused by air injection through the said lances.

A main gas offtake 37 for sulphur dioxide bearing furnace gases is provided above the exit end of the refiner zone D. A port 103 is provided in the roof 86 through which lump concentrates or lump ore may be added to the molten material in the refiner zone D.

The slag separation zone C of the furnace is provided with a slag weir 48 which may be air-cooled, a slag pool or well 49, a matte taphole 104 through which matte 105 may be tapped at infrequent intervals as required, a slag taphole 50, and an auxiliary gas offtake 106. The floor 47 of the slag separation zone C slopes gently upwards from the smelting zone A to the slag weir 48. A port 107 is provided in the roof 86 through which a reducing agent, such as iron sulphide, in the form of pyrites, pyrrhotite or low grade copper sulphide concentrates, and/or a carbonaceous fuel, may be added to the molten material in the slag operation zone C.

An oil burner 108 projects through the wall 80 into the smelting zone A and its flame is directed onto the surface of the molten material 40 therein; an oil burner 109 projects into the furnace extension 99 and its flame which is preferably oxidising is directed onto the surface of the molten copper in the copper reservoir 98, and products of combustion enter the furnace proper through port 109a; and oil burner 110 projects through the side wall 81 and its flame, which is preferably reducing, is directed onto the surface of the slag in the slag separation zone C; and an oil burner 111 projects through the end wall 83 and its flame, which is preferably reducing, is directed onto the surface of the slag in the slag pool 49.

Figure 21:
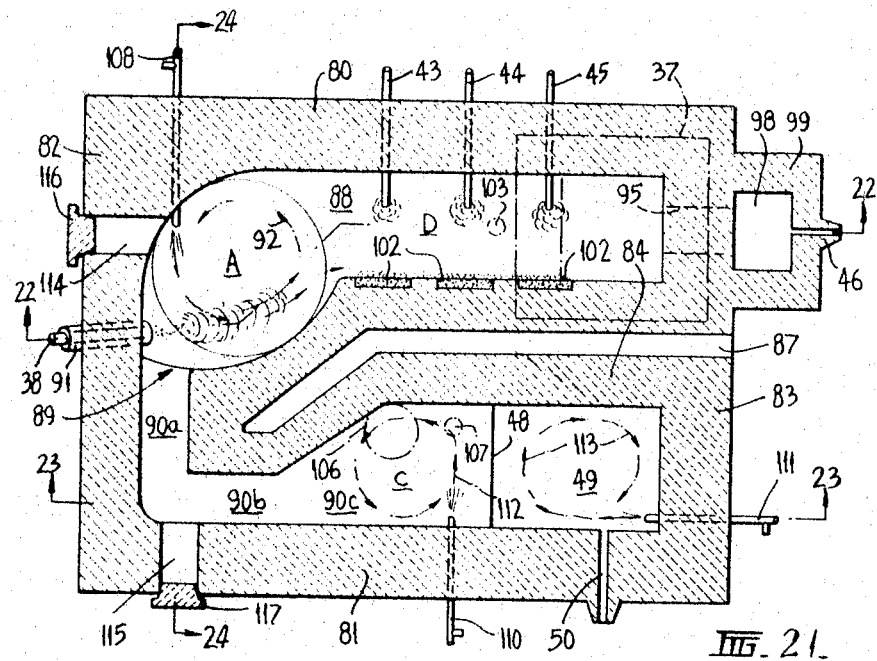
FIGURE 21 is a sectional plan view of a substantially U-shaped furnace constructed in accordance with the invention.
Figure 22:
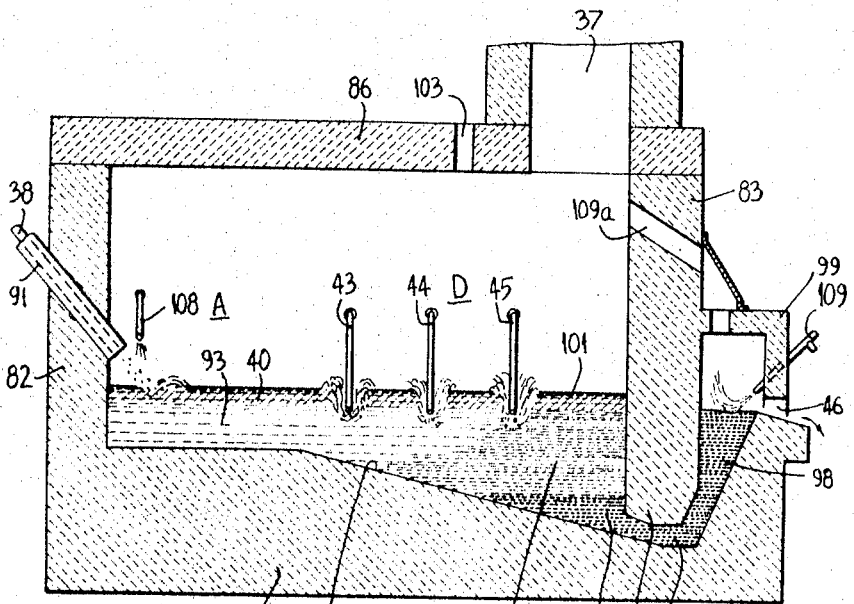
FIGURE 22 is a view in sectional elevation on the line 22—22 of FIGURE 21.

The oil burner 110 is directed transversely of the general direction of the flow of the slag through the slag separation zone C so as to impart a gentle circulation or eddying motion to the slag in the zone C as indicated by the arrows 112 in FIGURE 21. The oil burner 111 is directed onto the slag in the slag pool 49 so as to cause a gentle circulation of the said slag as shown by the arrows 113 in FIGURE 21. The circulation of slag indicated at 112, 113 is substantially confined to the surface layers of the said slag and is not such as to disturb the generally quiescent conditions prevailing in the slag separation zone C and slag pool 49. The said circulation of slag is such as to increase the residence time of the slag in the slag separation zone C and the slag pool 49 and thus provide greater opportunity for the elimination of copper from the slag by settling out of fine "prills" of metal of matte.

Inspection and sampling ports 114 and 115 are formed in the end wall 82 and side wall 81 respectively, and are closed by refractory plugs 116, 117 respectively. Port 115 is a convenient entry point for the addition to the bath of a reducing agent, such as a carbonaceous fuel, e.g. coal.

In the operation of the furnace shown in FIGURES 21 to 24, copper sulphide concentrates are blown in with air under pressure through lance 38 into the bath of molten material in the smelting zone A, the furnace having been preheated and charged with molten matte. Vigorous turbulence and circulation of the molten material in the smelting zone A is effected. Operation of the oil burner 108 assists the circulation of the molten material in zone A and supplements the heat provided by the oxidation of the sulphur and iron in the incoming concentrates.

Matte generated in the smelting zone A, being heavier than the slag, settles towards the floor of the furnace and then as it becomes heavier by the progressive elimination of sulphur and iron it gravitates down the sloping floor of the refiner branch D towards the sump 95. Air under pressure is blown through the lances 43, 44, 45 into the molten material in the refiner branch D so as to create vigorous turbulence in the said material and to effect the progressive oxidation of sulphur and iron in the matte in said zone D. Silicious flux in the form of silica sand or finely crushed copper ore is added through ports 102. The sulphur dioxide formed by oxidation of the sulphur enters the furnace gases which are withdrawn through gas offtake 37. The iron oxide formed in zone D reacts with the silica to form slag.

Lump copper sulphide concentrates are added through port 103, for the purpose of minimizing the formation of magnetite in the upper layers of the slag in the zone D. The slag 101 formed in zone D rises to the surface of the matte and as it accumulates on the surface of said matte it flows toward the smelting zone A countercurrently to the flow of matte in zone D. Copper 97 formed by oxidation of the white metal in the matte-white metal complex 100 in zone D settles out in the lower part of the zone D and flows through the sump 95 into the metal reservoir 98 from which it is tapped at taphole 46. An oxidizing flame from burner 109 may be directed onto the surface of the copper in reservoir 98 in order to oxidise residual sulphur. Alternatively, the sulphur may be removed in a separate furnace.

The slag flowing countercurrently in the refiner zone D flows through the smelting zone A in the general direction of the circulation of material in zone A, that is, mainly adjacent to the outer wall of zone A, its residence time in zone A being thereby increased. During its passage through zone A the freshly melted concentrates, now substantially in the form of droplets of matte, are agitated with and dispersed into the said slag. This has the effect of stripping of a substantial proportion of copper in the slag stream passing through zone A. The slag then flows from zone A into the relatively quiescent slag separation zone C, passing through the restricted portions 90a, 90b, of zone C into the larger portion 90c of said zone. Gentle circulation of the surface layers of the slag in portion 90c of zone C is effected by means of burner 110. Pyrites, or another source of iron sulphide, and/or a solid carbonaceous material, is added through port 107 and/or port 115 in order to effect removal of residual copper from the slag. The products of combustion of the burners 110 and 111 and sulphur dioxide from the combustion of the pyrites added through port 107 are withdrawn through auxiliary gas offtake 106.

It is desirable to maintain reducing conditions in the slag separation zone C in order to assist the separation of copper from the slag and also to convert to and to maintain in the ferrous state as much as possible of the iron in the slag, thereby minimizing the formation of undesirable massive wall and hearth accretions of magnetite. As indicated, a convenient manner of maintaining such reducing conditions in the slag separation zone C is by the addition of pyrites or another source of iron sulphide and/or by the addition of a reducing agent and/or by having a gentle jet of a reducing flame (such as, for example, from burner 110) directed at a relatively low angle over the slag so that gentle circulation is achieved and the iron sulphide and/or reducing agent is distributed and dispersed over the slag surface.

The gentle circulation induced in the slag separation zone C (for example by burner 110) increases the residence time of the top layers of slag in that zone and thus provides greater opportunity for matte particles to settle and thus decrease the amount of copper tapped in the slag.

Another manner of creating reducing conditions in the slag separation zone C is by prilling iron sulphide with oil so that when the oiled pyrites is added to the slag separation zone C the oil burns with a reducing flame at the slag surface. This also promotes the melting and incorporation into the slag of iron sulphide which itself acts as a reducing agent.

Matte which settles out from the slag in the slag separation zone C flows down the sloping floor 47 of said zone C towards the smelting zone A in a direction countercurrent to the general flow of slag through the zone C. The slag, after separation of matter and stripping of copper in zone C, flows over the slag weir 48 into the slag pool 49 where final separation of matte and copper therefrom is effected. Burner 111 is operated to raise the temperature of the slag in pool 49, to impart a gentle circulation of said slag in the pool 49 to ensure maximum matte separation, and, being a reducing flame, to minimize magnetite formation in the slag. Slag is tapped through slag taphole 50.

Referring to FIGURES 25 to 27, the numeral 120 represents a disc pelletiser in which composite pellets P are produced from oxide ores or concentrates, carbonaceous material and a binder.

The pellets P are fed from pan feeder 121 into one end of a rotary metallising kiln 122. In the heat recuperator 124 air is admitted at pipe 125 and products of combustion are removed through stack 126. The rotary kiln 122 delivers the metallised pellets into a column 123 which is mounted vertically over the smelting zone A of the furnace F, preferably to one side of zone A. The pellets fall by gravity in the column 123 into the circulating and turbulent bath of molten material in the said smelting zone. Air or steam, or both, may be admitted to column 123 through heat resistant retractable pipes 127a and 127b. Gases may be withdrawn through gas offtake 141a, which is controlled by a slide valve 145. A similar control valve (not shown) may be provided on stack 126.

The furnace F is provided with a substantially circular smelting zone A and with an elongated refining zone D and a slag separation zone C which are connected to the smeltnig zone A by restricted openings or passages a and b respectively.

The furnace F is of U-shape, the refining zone D and slag separation zone C being arranged parallel to one another and separated by wall 131, but it will be understood that furnaces of other shapes may be employed.

Lances 128a and 128b project through the wall of the furnace F into the smelting zone A, and are inclined downwardly and are also arranged substantially tangentially to the zone A. Air and/or particulate carbonaceous material may be injected into the bath in zone A through lances 128a and 128b. A burner 129 also projects tangentially into the smelting zone A. Apertures 142, 142' are provided in the roof of the furnace F through which fine lump basic refractories, e.g. dolomite, or other materials may be added to the bath, the apertures 142 being located above the smelting zone A and the aperture 142' being located above the slag separation zone C. Coke or other slag conditioning agents may be added to the slag separation zone through aperture 143.

Lances 132, 133, 134 project (if desired at an incline) into the refining zone D, and oxygen-containing gas is injected through the said lances into the turbulent molten material in the zone D. The lances 132, 133, 134 preferably incline downwardly and towards zone A. Metal is withdrawn from the refining zone D at tap-hole 139 and underneath slag baffle 140.

A slag weir 137 is provided in the slag separation zone C over which slag overflows into a slag pool 144, slag being withdrawn through taphole 138. A gas offtake 141b is provided above the slag pool 144. The floor of the slag separation zone C slopes downwards from the slag weir 137 to the level of the surface of the metal on the smelting zone A.

Banks 135, 136 of dolomite or other suitable basic refractory material are provided on opposite sides of the passages a and b between the smelting zone A and the refining zone D, and between the smelting zone A and the slag separation zone C, the banks 135, 136 serving to restrict the width of the passages a and b for the reasons hereinafter described.

In FIGURE 28, a furnace is shown in which the refining zone D is divided by a slag barrier into two refining zones 130a and 130b. The said slag barrier is formed by banks 146 of dolomite, fluid-cooled U-tubes 147 and a layer of slag 148 which builds up on the tubes 147.

In FIGURES 30 and 31, apparatus is shown in which a pressurised fluidised bed unit 160 is provided for preheating and prereducing fine unagglomerated iron ore or concentrates. The iron ore or concentrates are blended with a proportion of carbonaceous material (eg. about 4% by weight of powdered coal) and the blended mixture 166 is fed into hopper 163, from which it is fed by means of screw feeder 164 into the pressurised fluidised unit bed 160, the feed rate into the unit 160 being controlled by the speed of screw feeder 164.

A combustion chamber 167 fired by a burner 168 (eg. an oxy-oil burner) and having a valve 169 for removal of fines, is connected to the lower end of the fluidised bed unit 160 and delivers hot combustion gases upwardly through grate 170 into and through the fluidised bed 161. Heat is also generated in the fluidised bed 161 by partial burning in the bed of the coal mixed with the concentrate.

The preheated and partially prereduced concentrates leave the fluidised bed unit 160 through a heavily lagged wear-resistant and heat-resistant pipe 165 which is connected to a feeder-burner device 172. The device 172 projects through the side wall of the furnace F, for example in the position occupied by lance 128a in FIGURES 25 to 28, and injects preheated prereduced particulate concentrates into the bath of molten material in the smelting zone A of the furnace, preferably with sufficient velocity to ensure that the concentrates penetrate through the slag layer and into the molten metal therebeneath.

Any fines which leave the upper end of the fluidised bed unit 160 through pipe 173 pass through cyclone 174 and are returned through pipe 175 to the fluidised bed.

The feeder burner device 172 is shown in more detail in FIGURE 31 and comprises a central pipe 165 through which the hot concentrates are fed, a series of oil or propane pipes 176, a series of oxygen or air pipes 177, and a surrounding water jacket 178. The fine concentrates issuing in the form of a jet 179 from the end of pipe 165 are heated by the surrounding annulus of burner flames 180 formed by combustion of the jets of oil or propane and oxygen issuing from the ends of pipes 176, 177.

The heat in the exit gases from all embodiments of the invention may be used for such purposes as preheating feed materials, and/or incoming air, or, if they contain carbon monoxide, they may be used for prereducing as well as preheating.

In another form of this invention, the preheating and either pre-reduction or pre-oxidation is carried out in hot cyclones (not shown) in association with turbulent gas-solids mixing chambers. The preheated and either prereduced or pre-oxidised particulate materials are then transferred in the hot gases directly to the ports or lances to the circulatory smelting zone.

Preheating of the raw materials may be carried out using a conventional downwardly converging cyclone. Hot gases are led through the usual tangential pipe to the upper end of the cyclone. A short distance from the entry to the cyclone, the appropriate ores are fed into the pipe from an auxiliary pipe as fines. To induce the entry of the fines, the main pipe may be formed as a venturi adjacent to the auxiliary pipe.

In the cyclone the solids will be separated from the gases in conventional fashion, the solids falling and the gases escaping upwards.

Similar apparatus to that which has recently been developed to entrain fine coal in air or other gas streams and feed it through the tuyeres of iron blast furnaces may be used advantageously with this present invention.

In the smelting of nickel-iron sulphides, difficulties may develop if the conditions in the refining zone or branch are allowed to become too quiescent and oxidising towards the metal outlet end. It has been found that in the batchwise conversion of nickel sulphide to metal, jetting of oxygen onto a non-turbulent bath can lead to excessive localised build-up of nickel oxide which may form impenetrable layers and virtually stop the refining reaction. In this invention these difficulties may be avoided by (a) ensuring that vigorous turbulence is maintained in the refining zone, as by jetting with gas, and (b) incorporating a little fine coal or oil or other hydrocarbon with the oxygen-containing gas blown into the refining zone. By this means it is possible to achieve vigorous stirring without excessive oxidation of the hot bath, with its consequent tendency to form regions high in nickel oxides.

Nickel, having a much higher melting point than copper, must be produced at temperatures 300° to 400° C. higher than those of the reactions necessary to refine white metal ($Cu_2S$).

The process and apparatus of this invention can be applied to the smelting of lead-zinc ores, preferably oxidised, or mixtures of roasted lead-zinc sulphide concentrates or even slags containing lead and zinc. With such materials, the injection into the feed and primary smelting zone takes place as with other concentrates or finely crushed material, the fuel-reductant preferred being powdered coke breeze or low hydrogen content char or coal, although other carbonaceous fuels can be used. Alternatively, the fines only may be fed in through the tuyeres or lances while lamp ore or slag is fed to the furnace via a heat exchanger shaft or kiln.

In the smelting of zinc bearing materials, the zinc is not tapped with the reduced lead, or other less volatile metal, but leaves the furnace in the vapor phase in the hot carbon monoxide containing gases. Such gaseous zinc may then be condensed or absorbed in an appropriate separate apparatus, as for example the lead splash "condenser" developed by the Imperial Smelting Corporation Ltd. of Avonmouth, England. After recovery of the zinc, the combustible gases may be used for preheating air or lump feed materials or be used to entrain further fines to be fed to the furnace.

The following examples illustrate the invention.

EXAMPLE 1

Lead smelting in an annular furnace of the type shown in FIGURES 4 to 6 and lined with chrome-magnesite bricks.

Lead concentrates containing:

| | Percent |
|---|---|
| Lead | 77.2 |
| Sulphur | 15.1 |
| Zinc | 3.5 |
| FeO | 1.9 |
| $SiO_2$ | 0.9 |
| CaO | 0.2 |
| Others | 1.2 | were preheated in a screw type preheater to approximate 300° C. and injected with a hot 50:50 mixture of air and oxygen into the feed zone A of the furnace at position 38 at the rate of 1000 lb. per hour. The furnace had previously been charged with lead bullion and preheated to 1050° C. so that it had a fully liquid bath of lead covered with a high lead content slag.

Lime sand containing about 40% $SiO_2$ and 50% $CaCO_3$ was incorporated with the lead concentrates in the ratio of 50 parts of concentrates to one of lime sand. Further air-oxygen mixture was injected through lances at positions 41, 42 and 43 (see FIGURE 4). After the furnace had been operating for about 4 hours the proportion of oxygen in the injected gas was reduced somewhat so that the gas mixture contained approximately 35% oxygen. At this stage the lead being tapped from taphole 46 was relatively pure bullion containing about 98.9% lead, 0.42% sulphur, and the balance being made up of antimony, arsenic, zinc, copper, cadmium, gold and silver.

The slag tapped from taphole 50 contained:

| | Percent |
|---|---|
| Lead | 15 |
| ZnO | 12 |
| FeO | 10.5 |
| Sulphur | 1.5 |

EXAMPLE 2

Copper smelting in an annular furnace of the general shape shown in FIGURE 1 and line with chrome-magnesite bricks.

The furnace chamber was first heated by oil firing to 1250° C. and charged with matte from a previous smelting operation, such matte containing about:

| | Percent |
|---|---|
| Copper | 40 |
| Iron | 32 |
| Sulphur | 29 |

After the bath had become completely liquid the feeding of concentrates through lances at positions 38 and 39 was begun. The concentrates contained:

| | Percent |
|---|---|
| Copper | 24.2 |
| Iron | 30.5 |
| Sulphur | 32.1 |
| Insolubles | 7.0 |

A 50:50 air-oxygen mixture was blown in through lances at positions 41, 42, 43 and 44. After operating for about half an hour, white metal containing approximately 80% copper was being tapped at 46. The copper tenor progressively increased as the amounts of oxygen-containing gases were increased relative to the feed rate, which was maintained at 1400 lbs. per hour.

After about three hours of operation the metal being tapped at 46 contained over 99% copper, the major impurity being sulphur, 0.75%, which, however, was concentrated in the top layer of the metal on solidification.

Silicious flux in the form of fine dune sand of the following composition:

| | Percent |
|---|---|
| $SiO_2$ | 97.2 |
| $Al_2O_3$ | 1.7 |
| FeO | 0.5 | was added at positions 44 and 45 and the slag being tapped at 50 contained:

| | Percent |
|---|---|
| FeO | 41.7 |
| $SiO_2$ | 33.4 |
| Cu | 0.7 |

EXAMPLE 3

Further trials with copper concentrates were carried out in a graphite-lined furnace of the linear type shown in FIGURES 9 to 11, the furnace preheating and other conditions being similar to that in Example 2. After approximately 2 hours operation a copper product containing 99.1% metallic copper was tapped continuously in a small stream from a bottom taphole at position 46. The slag tapped continuously at 50 contained approximately 1.5% copper.

EXAMPLE 4

Several copper smelting trials were carried out in a two-branched furnace of the general shape shown in FIGURES 14 to 17. This furnace had graphite bricks lining the refining branch and chrome-magnesite bricks lining the feed-primary smelter zone. These trials gave improved performance in respect of general heat conservation and reduction of copper content in the slag tapped at 46. Using the same feed materials as in Examples 2 and 3 the slag tapped at 50 contained 0.5% copper, while the copper metal tapped at 46 was of the same degree of purity as in Example 3 and could readily be cast into anodes for electrolytic refining.

EXAMPLE 5

Iron smelting at the rate of 0.5 tons per hour.

In a chrome-magnesite lined furnace of the type shown in FIGURES 13 to 20 preheated by oil burners to 1300° C., and charged first with pig-iron containing 4.1% carbon, 1.3% silicon to give a molten bath, a 50:50 mixture of ore and brown coal char were injected in hot air at feed positions 78 and 79 after preheating by heat exchange from exit combusted gases to about 350° C. The finely ground ore contained:

| | Percent |
|---|---|
| Iron | 66.2 |
| $SiO_2$ | 2.7 |
| $Al_2O_3$ | 1.1 |
| Ignition loss | 1.0 |

Brown coal char contained:

| | Percent |
|---|---|
| Fixed carbon | 91.1 |
| Volatile matter | 2.7 |
| Ash | 6.2 |

Supplementary to the feed of particulate materials at 78 and 79, an approximately equal amount of iron bearing material was fed via a vertical refractory chute 61 from a preheating-prereducing kiln 76 into the centre chamber in the form of metallised pellets which themselves had been produced in the kiln by heating up to 1200° C. by partial combustion of the hot CO-rich gases leaving the furnace.

Pellets were made from a 80-20 mixture of finely ground ore and brown coal char of the above compositions. On discharge from the hot end of the kiln 76 into the chute 61 these pellets were found to contain 90.1% metallic iron and 4.2% carbon.

After about two hours operation the metal flowing around the annulus was found to have a composition of 3.1% carbon. By further lancing with oxygen of 99.5% purity at positions 43 and 44 in the refining branch 36 it was possible to oxidise out the carbon to produce any desired grade of steel at taphole 46. Burnt lime containing 95.2% CaO was injected as flux through a port near lance 45.

In most of the iron smelting experiments conducted, the carbon content in the steel tapped at 46 was not reduced below 0.6% so as to maintain relatively low melting point and good fluidity in the liquid steel. However, it is possible to lance the furnace metal with oxygen so as to produce steel of any desired carbon content down to the mild steel range.

EXAMPLE 6

Copper sulphide flotation concentrates from Mount Morgan, Australia, containing 24.2% copper, 30.5% iron, 32.1% sulphur and 7.0% insolubles were smelted in a furnace substantially as shown in FIGURES 21 to 24. The furnace was preheated and charged with matte of approximately 65 to 70%. Cu level from a previous smelting campaign. After the bath was completely liquid, dry concentrates at a temperature of between 200° and 350° C. were blown through the lance 38 (having an internal diameter of approximately 0.65 inch), air under pressure of between 20 to 30 p.s.i. being introduced through the annular space (having a radial width of approximately 0.1 inch) between the lance 38 and tube 91. The feed rate of concentrates during the run was about 600 lbs. per hour. The lance 38 was disposed in the manner shown in FIGURES 21 and 22 and terminated approximately 10 inches above the surface of the bath in the smelting zone A.

Air under pressure between 12 and 20 p.s.i. was blown through the high chromium steel lances 43, 44, 45 (each having an internal diameter of approximately 0.7 inch) into the molten material in the refiner branch. The lances 43, 44 and 45 were approximately disposed as shown in FIGURES 1 and 2 and terminated approximately at the level of the interface between the matte and the slag.

Siliceous flux (e.g. silica sand) was added by mechanical or pneumatic feeders through ports 102. The sulphur dioxide-bearing gases formed were withdrawn through gas offtake 37 and were taken via hot cyclones to a sulphuric acid plant. Additional ore or concentrates, preferably in lump form, and preferably in amounts ranging from 10% to 40% of the input of concentrates added through lance 38, were added through port 103, to reduce the formation of magnetite in the refining zone D.

The burner 108 was operated generally with a neutral flame, the oil burner 109 was operated with an oxidising flame, and the oil burners 110 and 111 were operated with reducing flames.

Pyrites, pre-prilled by rolling in a drum with a small proportion of a heavy mineral oil, was added through port 107 in amount equivalent to about 7% of the concentrates added through lance 38. Sulphur dioxide-bearing gases were withdrawn through gas offtake 106. The hot gases drawn off through offtake 106, still containing some partially combusted hydrocarbons, were used for drying and preheating the incoming concentrates in separate apparatus (not shown).

Copper as formed was withdrawn from taphole 46, slag was withdrawn almost continuously from taphole 50, and small quantities of matte were tapped at approximately 48 hours intervals from taphole 104.

The copper product withdrawn from taphole 46 contained from 99.0 to 99.5% copper depending on the amount of further oxidising treatment it received by the jetting of the oxidising flame from burner 109. A typical analysis of the copper product was as follows:

| | Percent |
|---|---|
| Copper | 99.10 |
| Sulphur | 0.80 |
| Iron | 0.004 |
| Lead | 0.005 |
| Antimony | 0.007 |
| Bismuth | 0.005 |
| Arsenic | 0.005 |
| Nickel | 0.02 |
| Zinc | 0.004 |
| Other | 0.05 |

The slag withdrawn from taphole 50 usually contained less than 0.5% copper and for long periods when the furnace was operating under steady state conditions the copper-in-slag was in the range 0.30 to 0.36%. These figures are comparable to the best reverberatory furnace practice, where, of course, only matte is being produced and that on a batchwise basis.

A typical analysis of slag was as follows:

| | Percent |
|---|---|
| $SiO_2$ | 38.3 |
| FeO | 49.7 |
| Other oxides | 10.9 |
| S | 0.7 |
| Cu | 0.36 |

The preferred range for $SiO_2$ in slag is 36 to 42% while that for FeO is 45 to 50%. The presence of between 2 and 5% of CaO+MgO in the slag seems to be advantageous.

EXAMPLE 7

The operation of the apparatus shown in FIGURES 25 to 29 will now be described with reference to runs which were carried out in a pilot plant at Cockle Creek, New South Wales, Australia, which was constructed substantially as shown in the figures.

The concentrates used consisted essentially of very finely ground magnetite from Palabora in South Africa. These contain a small percentage of $TiO_2$ in addition to other gangue minerals, and it was demonstrated by the pilot plant trials that the method and apparatus of this invention enable the effective elimination not only of titanium but of other unwanted impurities such as sulphur and phosphorus. The concentrates analysed:

| | Percent |
|---|---|
| Fe | 67.2 |
| MgO | 2.3 |
| CaO | 0.98 |
| $Al_2O_3$ | 0.68 |
| $TiO_2$ | 0.58 |
| $SiO_2$ | 0.30 |
| Mn | 0.15 |
| S | 0.03 |

Screen sizings showed that 100% passed 32 mesh BS screen, 98.2% passed through a 60 mesh screen, 90% through a 200 mesh screen and 55% through a 325 mesh screen. The concentrates were well suited for pelletising.

The principal fuel-reductant used consisted of a gas making coal from Aberdare in New South Wales, Australia having the following proximate analysis (dry basis):

| | Percent |
|---|---|
| Fixed carbon | 52.2 |
| Ash (mostly $SiO_2$ but with some $Al_2O_3$) | 4.0 |
| Volatiles | 42 |
| Sulphur | 1.0 |

A gas coke breeze made from a similar coal, was employed along with the above mentioned coal as a component of the pellet blend and also as a "cushioning" material in the metallising kiln. This gas coke breeze analysed (dry basis):

| | Percent |
|---|---|
| Fixed carbon | 88.2 |
| Ash (about 5% $SiO_2$, 3.9% $Al_2O_3$) | 8.9 |
| Volatiles | 1.7 |
| Sulphur | 0.73 |

Composite pellets averaging ⅜ inch (about 1 cm.) diameter were made by blending the concentrates, finely ground (100% minus 32 mesh) coal and coke breeze in the following proportions:

| | Percent |
|---|---|
| Magnetite concentrates | 80.0 |
| Aberdare coal | 10.0 |
| Coke fines | 9.0 |
| Bentonite (binder) | 1.0 |

After rapid metallisation in the kiln 122 and with a maximum final metallising temperature of 1250° C., these pellets were found to analyse on the average:

| | Percent |
|---|---|
| Total Fe | 79.0 |
| Metallic Fe | 71.0 |
| Metallisation | 90 |

Under correct metallising conditions the pellets contained between 1.0 and 3% residual carbon. This is beneficial in the actual bath smelting operation; it contributes both to the reduction of the small amount of iron oxide which remained in the pellets and to the maintenance of some carbon in the hot metal of the bath.

Some burnt lime was added to the smelting bath to control basicity and minimise frothing tendencies. This lime contained 97.5% CaO.

The composite pellets were produced from the carefully proportioned blend of magnetite concentrates, fine coal, fine coke breeze and 1.0% bentonite binder, in the disc pelletiser 120.

The green pellets, containing usually about 7 to 8% $H_2O$, were fed via the pan feeder 121, which also served as a drier, into the metallising kiln 122. This revolved at 2.5 r.p.m. and its slope was adjusted so that the residence time of the pellets in the kiln was about 8 to 10 minutes. The pellets were heated rapidly by heat exchange from the hot furnace gases (mainly $CO-CO_2$ mixtures) passing up the column 123, countercurrent to the falling pellets, and along the kiln 122, again countercurrent to the pellets, finally being completely combusted in the heat recuperator 124 by air admitted at 125 and leaving the stack at 126.

The temperature profile in the mass of pellets along the length of the slowly rotating kiln 122 was carefully adjusted by admission of air and/or steam, as requirements dictated, through the retractable pipes 127a and 127b, so that there was a rapid rise from about 200° C. at the entry end to about 1000° C. mid-way along the kiln 122. The temperature rose to between 1200° and 1250° C. at the discharge end of the kiln 122 where the white hot pellets then fell freely down column 123, countercurrent to the hot reducing gases, into the circulating bath in the smelting zone A of the furnace F.

During the last minute or so in the kiln the temperature was high enough to effect a degree of densification in the small pellets, and they developed sufficient momentum on falling to penetrate through the slag layer and down to the metal in the circulating and turbulent bath A.

The circulation and turbulence was maintained by jetting air, in which finely ground coal was entrained, through lances 128a and 128b. The coal was delivered into the compressed air lines from a rotary coal pump (not shown) of a design developed by the Aeronautical Research Laboratories, Fishermens Bend, Victoria, Australia.

Whenever extra heat was required in the bath A, particularly in the early stages of a campaign, an oxy-gas jet was impinged on the surface from burner 129. The angle of this burner, as with the coal-air injection lances 128a and 128b, was such as to generate the maximum circulation and some turbulence in the bath A. This circulation and turbulence prevented any cold, sluggish regions developing in the bath A, and are of importance in achieving continuous and uniform smelting conditions. It was found that if circulation stopped, the region where the hot but solid pellets entered the bath rapidly became sluggish and could, in fact, partially freeze. On restarting circulation and heating the bath up to more than 1500° C., violent boiling could take place owing to the "delayed" reaction between the oxygen left in the pellets and the carbon in the white hot metal.

Optimal bath temperatures were found to vary slightly depending on the rate of pellet feed and on the residual carbon in the metallised pellets. Generally the most satisfactory smelting, with uniform continuous boiling in the circulating bath, was achieved with bath temperatures of 1500° C. ±25° C. If the temperature dropped below 1400° C. the bath reactions tended to become sluggish and uneven while if the temperature exceeded 1550° C. the boiling reaction tended to become too fierce and refractory erosion too severe.

In some of the smelting runs the object was to make a semi-steel with between 2.5 and 3 percent carbon but free from titanium, and with very low values for sulphur and phosphorus. In such cases little oxygen was jetted into the slowly flowing metal in the refining branch D. All that was necessary was to blow a little fine burnt lime into the bath through lance 132. This lime formed a very basic slag, mainly calcium ferrite, which flowed countercurrent to the metal back into the smelting zone A where it reacted not only with the higher carbon metal underneath but also with the silicious and aluminous slags forming the gangue in the pellets as they dissolved into the metal bath in zone A. The basicity of the slag formed from this association was controlled by the amount of lime injected via lance 132. The $(CaO+MgO)/(SiO_2+Al_2O_3)$ ratio in the slag leaving the smelting zone A and flowing into the slag separation zone C was generally maintained in the range 1.0 to 1.5. The higher the basicity the more potent the refining action with respect to sulphur and phosphorus. As the concentrates used were relatively low in both sulphur and phosphorus and the coal was also relatively lanced into the metal in the refining branch D. If it is desired to make silicon-containing metal or to add ferromanganese or other deoxidants or to produce alloy irons or steels, these additions are best added as the stream of metal flows from the furnace through 139.

The levels of sulphur and phosphorus in the steel or semi-steel rarely exceeded 0.02% and where frequently less than 0.005%.

A typical analysis of a medium carbon steel produced in the apparatus was:

| | Percent |
|---|---|
| Carbon | 0.61 |
| Silicon | 0.01 |
| Manganese | 0.02 |
| Sulphur | 0.011 |
| Phosphorus | 0.005 |
| Titanium | 0.001 |
| Iron (by difference) | 99.34+ |

The composition of the slags tapped from 138 was determined according to the feed materials and degree of refining desired. Usually the $(CaO+MgO)/(SiO_2+Al_2O_3)$ ratios were in the range 1.1 to 1.5

Typical analysis of slags tapped from the furnace while making a medium carbon steel as listed above were:

| | Sample No. 1 | Sample No. 2 |
|---|---|---|
| Percent: | | |
| CaO | 39.0 | 36.5 |
| MgO | 6.7 | 9.7 |
| SiO₂ | 30.0 | 33.0 |
| Al₂O₃ | 6.8 | 9.8 |
| FeO | 5.9 | 7.6 |
| TiO₂ | 1.78 | 2.93 |

The above mentioned slags differ considerably from open hearth slags in being much lower in FeO content. This reduction in iron loss in slags is attributable to the fact that before the slag can escape from the furnace it has to flow back countercurrent to the metal and in the smelting zone A it becomes intimately mixed with much higher carbon metal (usually about 3% carbon). The carbon in the metal is continuously reacting with iron oxides in the slag by reactions of the type:

$$[C]+FeO \rightarrow Fe+CO$$

and the longer the residence time allowed in contact with the higher carbon metal the lower will be the FeO content of the slag. In general, the slags tapped from furnaces constructed according to this invention have composition somewhat intermediate between normal blast furnace slags and those produced in conventional batchwise steelmaking processes.

EXAMPLE 8

Further smelting trials were conducted in which preheating was achieved in the pressurised fluidised bed unit 160 shown diagrammatically in FIGURE 30. Fine unagglomerated magnetite concentrates of the same composition as given in Example 7, were used. The heating of the concentrates was achieved by or from:

(a) Hot (1100° C.) combustion gases passing up through the fluidised bed 161 from the combustion chamber 167 fired by the oxy-propane burner 168 and (b) The partial burning in the bed of about 4% by weight of coal (added to the concentrates in a blender before feeding dry into hopper 163).

The concentrates left the fluidised bed 161 via pipe 165 at about 1000° C. and between 15% and 20% reduced. The pipe 165 was directly connected to the feeder-burner device 172 shown in FIGURE 31, which was so angled as to cause the hot particulate feed to impinge into the molten bath A and to assist in its circulation.

During the passage along about 20 feet of pipe 165, the concentrates lost about 100° to 150° C. in temperature and the purposes of the annulus of white hot flames generated by the oxygen and oil jetting out of alternate fine holes in the copper jacketed and water cooled feeder-burner 172 was to restore the lost heat and to heat the finely particulate concentrates to over 1000° C. before they jetted into the smelting bath A. The velocity of the carrier gas and that from the "envelope" burner 172 was sufficient to blow a hole in the somewhat frothy slag in bath A and so permit the hot partially reduced concentrate particles to impinge directly into the circulating metal bath A. The mass of the magnetite particles in the hot gas stream effectively increased its momentum and so assisted in maintaining circulation of the bath.

More smelting-reduction of the concentrates was achieved by the carbon in the bath A. This necessitated increasing the quantity of fine coal addition via the coal-air injection lances, which for these trials were inserted at positions 128b and 129. As would be expected the bath "boiling" actions were more vigorous with the particulate ore additions than when more completely metallised feed was being fed. By careful control over bath temperatures (maintained in the range 1440° to 1500° C.) and ensuring that the carbon did not fall below 3%, nor the slag layer build up beyond about 1.5 inch (approximately 4 cm.) no serious difficulties were experienced with the boiling reactions.

EXAMPLE 9

The apparatus shown in FIGURES 25 to 27 was also used, with minor modifications, for the continuous direct smelting of rich lump hematite ore.

The hermatite ore analysed:

| | Percent |
|---|---|
| Fe | 68.0 |
| SiO₂ | 1.2 |
| Al₂O₃ | 0.8 |
| P | 0.03 |
| S | 0.01 |

The magnetite concentrates were those earlier described in this specification.

In one smelting trial the lump hematite ore, screened —⅝ inch +¼ inch (approximately —15 mm. +6 mm.) was fed with half its weight in fine (—¼ inch) coal and coke breeze (50:50 mixture—via the kiln 122). The only alterations in practice were that the speed of the rotation of the kiln was reduced to 1 r.p.m. and its slope reduced to less than 1° so that the residence time of the lumps in the kiln was of the order of half an hour instead of 8 to 10 minutes for the composite pellets. Furthermore, by adjustment of the dampers 145 in stacks 126 and 141a, the temperature in the partially reduced ore lumps discharging from the kiln 122 and down column 123 into the smelting bath A, was kept between 1100° C. and 1200° C. When the partially reduced ore lumps reached temperatures over 1200° C. some fusing and ringing occurred in the kiln 122.

The degree of metallisation in the ore lumps ranged between 40% and 65%, and consequently there was more oxide to be reduced in the circulating bath. This necessitated stepping up the quantity of coal jetted in with the air via lances 128a and 128b. The carbon additions from this source, together with the residual coke or char which entered with the partially reduced or lumps, were maintained at such level as to keep the smelting zone metal bath A in the range 3.0 to 3.5% carbon. Its temperature was maintained in the range 1450° to 1500° C.

The capital cost of the closely integrated continuous plant of this invention is substantially less than that of the combination of conventional coke ovens, sinter or pellet plants, blast furnace and batchwise oxygen steelmaking. Furthermore, due to the potential for high efficiency in heat utilisation, the operating costs are less than with the conventional batchwise processes.

I claim:

1. Apparatus for the continuous direct smelting of ores and concentrates to metal and for the refining of said metal, comprising; a furnace having one substantially enclosed zonalized chamber including a smelting zone, a low in sulphur and free from phosphorus it was usually sufficient to maintain the basicity ratio in the range 1.0 to 1.2. This is also a suitable range when smelting concentrates containing small percentages of titanium.

In those smelting trials in which it was desired to refine the hot metal into the steel range, additional oxygen was injected sequentially in the refining branch D through lances 132, 133 and 134.

When medium to low carbon steels were being produced, and partially steels below 0.3% carbon, some "surges" in the bath boiling action tended to occur as the highly oxidised slag moved back countercurrent to metal and approached the smelting zone or bowl A with metal averaging about 3% carbon. The "boil" reactions develop from several sources but here we refer to the reactions deriving from:

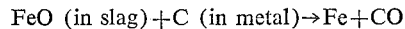
FeO (in slag)+C (in metal)→Fe+CO

The "surges" or "instability" were brought under control by providing restrictions in the refining branch D, firstly at 135 at the junction of the refining branch D with the smelter bowl A, and secondly at 146 at a point in the refining branch D where the carbon in the metal is dropping rapidly into the low carbon range—say below 0.47. The said restrictions can be built into the refractory structure of the furnace F but they were more simply and cheaply achieved by adding crushed dolomite through appropriately located ports in the roof or side walls, such as those shown at 142, thus building up dolomite banks such as those shown at 135 and 146.

In the form of furnace shown in FIGURE 26 only one restriction was provided, at 135. This is usually sufficient when medium to high carbon steels are being produced, but as implied above, a second restriction, as shown at 146 in FIGURE 28, was found beneficial when low carbon steels are to be made. In such operations it was found advantageous to provide not only a restriction at some position such as 146 but to provide an actual slag barrier at this point and so, in effect, divide the refining branch into two zones, designated in FIGURE 28 as 130a and 130b. The first was slag covered and achieved not only the major reduction in the bath carbon (from say 3% down to perhaps 0.5%) but the removal of virtually all the sulphur and phosphorus as the backward flowing highly basic slag was continuously stirred into the metal by the oxygen jetting actions. The second zone 130b, needed no substantial slag layer for, as has just been stated, the refining with respect to sulphur and phosphorus was already substantially achieved. The blowing of the carbon down to the desired level can be done in slag free metal. A slag layer at this point minimises reflection of heat from the white hot metal onto the furnace roof, but this can be done by a mere film of slag and does not need a thick layer which would absorb excessive amounts of iron oxides which would then have to be reduced out of the slag (with the dangers of violent boiling) at it flows back towards the smelting bowl A.

The slag barrier between refining zones 130a and 130b can be effected by inserting fluid cooled U-tubes 147 through a slot in the outside wall of the refiner branch D and also through the dolomite bank 146. The tubes 147 quickly became coated with slag and as the frozen layer of slag 148 built up around the pipes a slag "bridge" was formed across the narrow passage between the dolomite banks 146. Metal could flow freely under the bridge and gases could pass (backward) over the bridge, but flow of slag towards the taphole 138 was substantially prevented. Only a thin layer of slag existed on the low carbon steel in zone 130b. If it is desired to prevent this very small amount of slag flowing out with the molten steel a slag baffle 140, as shown in FIGURES 26 and 27, can be employed. Otherwise the metal can flow out freely via a lip type taphole 139 as shown in FIGURE 28.

Similar dolomite banks 136 and the associated restriction in the width of flowing slag were found to be beneficial between the smelting zone A and the slag separation zone C.

The floor of the slag separation branch C was at a higher level than that of the smelter zone A and refining branch D and sloped from about or just below the level of the metal in the smelting zone up to the overflow weir 137, which was just below the intended top level of the slag in the bath.

The combination of the restrictions 136 and the raised and sloping floor of the zone C ensured that the bath boiling reactions in zone A, due to formation and release of carbon monoxide bubbles in the metal, were prevented from extending to any appreciable extent into the more quiescent slag settling branch C.

In some smelting runs when the FeO content of the slag was higher than usual, primarily because a lower carbon metal was being produced in the smelting zone A, it was found advantageous either to insert graphite rods (not shown) through the slag slowly flowing into zone C or to cover the slag in this zone with coke breeze added through port 143. The carbon in the graphite or coke reacted with FeO in the slag according to the equation FeO+C→Fe+CO and the resultant metal Fe settled to the sloping hearth and gravitated back into the smelting zone A.

The slag continuously overflowed weir 137 into pool 144 where final settling of any prills was achieved, and slag thence flowed out of the furnace at taphole 138. The semi-steel or steel, as the case may be, was tapped via taphole 139 at a slightly lower level, preferably with slag outflow at 139 being prevented by baffle 140 or 148 as the case may be. The prevention of slag outflow with metal was not as difficult in this continuous furnace as would be the case with batchwise operation because the depth of the slag layer was not allowed to become greater than about 1.5 inches.

Three gas offtake stacks were provided at 126, 141a and 141b respectively. Each of these stacks was provided with a sliding silicon carbide "valve" or "Damper" as at 145 to control the outflow of the hot gases. By regulating the flow of gases through the three stacks the temperature in the different zones could be controlled, and dust losses were minimised.

It was found to be particularly desirable to control the flow of hot $CO$–$CO_2$ mixtures through kiln 122. Too little flow of such gases resulted in inadequately metallised pellets; too much flow, particularly if at a temperature over 1300° C., led to the partial melting of higher carbon content pellets in the kiln with consequent "ringing" and the necessity for frequent shut-downs for the kiln maintenance.

The rate of pellet throughout, the residence time in kiln 122 and the temperature and flow rate of the outgoing gases were selected so as to achieve a final metallising and densification temperature of about 1200° to 1250° C.

Wet scrubbers, not shown, were used to clean the outgoing gases of most of their entrained dust and fume. The collected "sludge," which consisted mainly of iron oxides and carbon, was thickened and returned to the pelletising unit, thus re-entering the smelting circuit. The dust and fume was relatively small.

The metal produced and tapped at 139, whether a semi-steel or steel proper, was in all cases virtually a straight iron-carbon alloy. Unlike blast furnace smelting the conditions in the smelting zone A are generally not sufficiently hot and reducing to cause any significant quantities of silicon or titanium to enter the metal. The method is therefore particularly suited to the direct smelting of titanium bearing magnetites. If conditions in the smelting zone A should become so hot and so reducing that some silicon and titanium are reduced from $SiO_2$ and $TiO_2$ respectively and enter the hot metal, these elements have only a short existance in the metal bath for they are oxidised out when an oxygen-containing gas is refining zone and a slag separation zone, the zones being substantially separate from but in communication with each other and being disposed substantially in the same horizontal plane; one end of the refining zone being connected to the smelting zone; a metal outlet adjacent the end of the refining zone remote from the smelting zone; one end of the slag separation zone being connected to at least one of the other two ones at a point spaced from the metal outlet; a slag outlet adjacent the other end of the slag separation zone; means for maintaining in the furnace a continuously flowing stream of molten material which flows from the smelting zone to the refining zone; means for introducing ores and concentrates into the stream of molten material in the smelting zone; means for injecting oxygen-containing gas into the stream of molten material in the smelting zone and in the refining zone so as to cause turbulance and circulation of the molten material in the smelting zone and so as to assist the slag to flow countercurrently to the metal in the refining zone and to flow into the slag separation zone; means for substantially preventing the flow of metal into the slag separation zone; and means for facilitating the return to the refining zone of metal which separates from the slag in the slag separation zone.

2. Apparatus according to claim 1 wherein the smelting zone is generally circular in plan, and having at least one lance arranged substantially tangentially to the smelting zone through which reactants are injected.

3. Apparatus according to claim 1 wherein a series of lances are provided in the refining zone through which oxygen-containing gas is injected.

4. The apparatus of claim 1 wherein the floor of the refining zone slopes downwardly towards the metal outlet.

5. The apparatus of claim 4 and having a metal reservoir adjacent to the metal outlet, and having a baffle depending into the metal reservoir to a point below the intended level of metal therein.

6. The apparatus of claim 1 wherein the entry to the slag separation zone is restricted.

7. The apparatus of claim 1 wherein the floor of the slag separation zone slopes upwardly from the entry end of said zone toward the slag outlet.

8. The apparatus of claim 7 wherein the floor of the slag separation zone at the entry end of said zone is approximately at the intended level of the molten metal in the smelting zone.

9. The apparatus of claim 7 and having a slag pool between the higher end of the floor of the slag separation zone and the slag outlet, and a slag weir at said higher end over which slag overflows into the slag pool.

10. The apparatus of claim 1 wherein the smelting zone is located between the refining zone and the slag separation zone.

11. The apparatus of claim 1 wherein the smelting zone is generally circular in plan, and the refining zone and slag separation zone are generally of elongated rectangular shape in plan and are connected to the smelting zone at spaced points therearound.

12. The apparatus of claim 11 wherein the refining zone and slag separation zone are disposed on diametrically opposite sides of the smelting zone.

13. The apparatus of claim 11 wherein the refining zone and the slag separation zone are disposed parallel to one another and side by side.

14. The apparatus of claim 1 wherein the smelting zone and the refining zone are arranged in a substantially linear section of the furnace, and the slag separation zone is arranged in a lateral branch of the furnace which connects with the said linear section of the furnace at a point spaced from each end thereof.

15. The apparatus of claim 1 wherein the furnace is substantially annular in plan, and the refining zone and slag separation zone are formed in lateral branches of the furnace which connect with the annulus at spaced points therearound.

16. The apparatus of claim 1 and having means for preheating ore prior to its introduction to the smelting zone.

17. The apparatus of claim 1 and having means for pelletising, preheating and prereducing iron oxide ore prior to its introduction to the smelting zone.

18. The apparatus of claim 17 and having means for dropping the preheated prereduced pelletised iron oxide ore into the smelting zone, and means for blowing carbonaceous reducing material substantially tangentially into the smelting zone.

19. The apparatus of claim 16 wherein particulate ore is preheated in a fluidised bed and is then blown into the smelting zone through tubes.

20. The apparatus of claim 1 wherein the entry to the refining zone is restricted.

21. The apparatus of claim 20 wherein a second restriction is provided in the refining zone between the entry end thereof and the metal outlet.

References Cited

UNITED STATES PATENTS

| | | | |
|---|---|---|---|
| 596,992 | 1/1898 | Garretson | 266—11 X |
| 1,803,663 | 5/1931 | Carson | 75—73 |
| 1,815,946 | 7/1931 | Langer | 75—40 |
| 1,911,379 | 5/1933 | Marx | 266—11 X |
| 2,161,180 | 6/1939 | Marx | 266—11 |
| 2,557,650 | 6/1951 | Gilliland | 75—40 |
| 2,750,277 | 6/1956 | Marshall | 266—11 X |
| 3,140,168 | 7/1964 | Halley et al. | 75—40 X |
| 3,214,264 | 10/1965 | Von Bogdandy | 266—21 X |
| 3,215,424 | 11/1965 | Kanamori | 75—60 X |
| 3,287,006 | 11/1966 | Tsuyoshi et al. | 266—11 |
| 3,326,671 | 6/1967 | Warner | 75—40 |

FOREIGN PATENTS

| | | |
|---|---|---|
| 1,238,667 | 7/1960 | France. |

J. SPENCER OVERHOLSER, Primary Examiner

U.S. Cl. X.R.

266—34

UNITED STATES PATENT OFFICE
CERTIFICATE OF CORRECTION

Patent No. 3,463,472                    Dated August 26, 1969

Inventor(s) H. K. Worner

It is certified that error appears in the above-identified patent and that said Letters Patent are hereby corrected as shown below:

In the Specification:

Column 6, Line 53 - "countercurrently" should be -- concurrent:

Column 11, Line 27 - "slag operation" should be -- slag separat

Column 11, Line 58 - "of" in the second instance should be -- c

Column 15, Line 34 - "lamp" should be -- lump --

Column 18, Line 73 - "concentrates" should be -- concentrates -

Column 20, Line 75 - "the coal was also" should read -- the coa used was also --

Column 21, Line 23 - "0.47" should be -- 0.4% --

Column 22, Line 52 - "throughout" should be -- throughput --

In the Claims:

Claim 1, Column 25, Line 8 - "ones" should be -- zones --

Claim 12, Column 26, Line 2 - "opposits" should be -- opposite

SIGNED AND SEALED

JUN 2 1970

(SEAL)
Attest:

Edward M. Fletcher, Jr.
Attesting Officer

WILLIAM E. SCHUYLER, JR.
Commissioner of Patents